(12) United States Patent
Vollenwyder et al.

(10) Patent No.: US 8,544,622 B2
(45) Date of Patent: Oct. 1, 2013

(54) PRODUCING ELECTROMAGNETIC FIELDS FOR TRANSFERRING ELECTRIC ENERGY TO A VEHICLE

(75) Inventors: Kurt Vollenwyder, Kingston (CA); Jürgen Meins, Braunschweig (DE)

(73) Assignee: Bombardier Transportation GmbH, Berlin (DE)

( * ) Notice: Subject to any disclaimer, the term of this patent is extended or adjusted under 35 U.S.C. 154(b) by 149 days.

(21) Appl. No.: 13/063,822

(22) PCT Filed: Sep. 17, 2009

(86) PCT No.: PCT/EP2009/006928
§ 371 (c)(1),
(2), (4) Date: Mar. 14, 2011

(87) PCT Pub. No.: WO2010/031593
PCT Pub. Date: Mar. 25, 2010

(65) Prior Publication Data
US 2011/0253495 A1    Oct. 20, 2011

(30) Foreign Application Priority Data
Sep. 19, 2008   (GB) .................................. 0817311.4

(51) Int. Cl.
*B60L 9/00* (2006.01)
(52) U.S. Cl.
USPC .......................................................... 191/10
(58) Field of Classification Search
USPC .................................. 191/2–6, 10, 22 R, 23 R
See application file for complete search history.

(56) References Cited

U.S. PATENT DOCUMENTS

| | | | |
|---|---|---|---|
| 2,518,736 A | 8/1950 | Wheeler | |
| 3,225,351 A | 12/1965 | Chatelain et al. | |
| 3,513,338 A | 5/1970 | Poloujadoff | |
| 3,863,574 A | 2/1975 | Thomas | |

(Continued)

FOREIGN PATENT DOCUMENTS

| | | |
|---|---|---|
| DE | 1806977 | 6/1969 |
| DE | 2310812 | 9/1973 |

(Continued)

OTHER PUBLICATIONS

Chen et al., "Inductive Power Transferring in Maglev Using Harmonic Injection Method", IEEE, 2004, pp. 1165-1170.

(Continued)

*Primary Examiner* — R. J. McCarry, Jr.
(74) *Attorney, Agent, or Firm* — The Webb Law Firm

(57) ABSTRACT

The invention is a system for transferring electric energy to a vehicle. The system includes an electric conductor arrangement for producing an alternating electromagnetic field and for thereby transferring the energy to the vehicle. The electric conductor arrangement includes at least one alternating current line, wherein each alternating current line carries one phase of an alternating electric current. The conductor arrangement includes a plurality of consecutive segments, wherein the segments extend along the path of travel of the vehicle. Each segment includes one section of each of the at least one alternating current line. The system also includes a direct current supply line for supplying electric energy to the segments. Each segment is connected to the supply line via at least one inverter which inverts a direct current carried by the supply line to an alternating current carried by the at least one alternating current line.

13 Claims, 18 Drawing Sheets

(56) References Cited

U.S. PATENT DOCUMENTS

| | | |
|---|---|---|
| 3,914,562 A | 10/1975 | Bolger |
| 4,068,152 A | 1/1978 | Nakamura et al. |
| 4,328,499 A | 5/1982 | Anderson et al. |
| 4,331,225 A | 5/1982 | Bolger |
| 4,836,344 A | 6/1989 | Bolger |
| 5,311,973 A | 5/1994 | Tseng et al. |
| 5,573,090 A | 11/1996 | Ross |
| 5,669,470 A | 9/1997 | Ross |
| 5,708,427 A | 1/1998 | Bush |
| 5,821,728 A * | 10/1998 | Schwind ............... 320/108 |
| 5,898,579 A | 4/1999 | Boys et al. |
| 6,005,304 A | 12/1999 | Seelig |
| 6,089,362 A * | 7/2000 | Takasan et al. ............ 191/10 |
| 6,089,512 A | 7/2000 | Ansorge et al. |
| 6,230,861 B1 | 5/2001 | Cornic |
| 6,250,442 B1 | 6/2001 | Perraud et al. |
| 6,286,434 B1 | 9/2001 | Fischperer |
| 6,382,378 B1 | 5/2002 | Cornic |
| 6,407,470 B1 | 6/2002 | Seelig |
| 6,421,600 B1 | 7/2002 | Ross |
| 6,462,432 B1 | 10/2002 | Seelig et al. |
| 6,499,701 B1 | 12/2002 | Thornton et al. |
| 6,502,517 B1 | 1/2003 | Groening et al. |
| 6,753,666 B2 | 6/2004 | Fischperer |
| 6,868,073 B1 | 3/2005 | Carrender |
| 6,879,889 B2 | 4/2005 | Ross |
| 6,985,107 B2 | 1/2006 | Anson et al. |
| 7,038,573 B2 | 5/2006 | Bann |
| 7,084,527 B2 | 8/2006 | Futschek |
| 7,116,540 B2 | 10/2006 | Green et al. |
| 7,243,752 B2 | 7/2007 | Green et al. |
| 7,276,812 B2 | 10/2007 | Uhl |
| 7,277,675 B2 * | 10/2007 | Lohr et al. ............... 455/41.1 |
| 7,298,314 B2 | 11/2007 | Schantz et al. |
| 7,365,698 B2 | 4/2008 | Dwyer et al. |
| 7,385,363 B2 | 6/2008 | Schemm |
| 7,511,250 B2 | 3/2009 | Lindig |
| 7,518,520 B2 | 4/2009 | Mullins |
| 7,560,927 B2 | 7/2009 | Maguire et al. |
| 7,694,632 B2 | 4/2010 | Ellmann et al. |
| 2003/0105560 A1 | 6/2003 | Sugita et al. |
| 2003/0200025 A1 | 10/2003 | Ross |
| 2005/0161300 A1 | 7/2005 | Green |
| 2005/0178632 A1 | 8/2005 | Ross |
| 2006/0197939 A1 | 9/2006 | Baiker et al. |
| 2007/0289476 A1* | 12/2007 | Schemm et al. ............ 104/290 |
| 2008/0129246 A1* | 6/2008 | Morita et al. ............ 320/108 |
| 2008/0316085 A1 | 12/2008 | Rofougaran et al. |
| 2008/0316103 A1 | 12/2008 | Rofougaran et al. |
| 2009/0013899 A1 | 1/2009 | Wolf et al. |

FOREIGN PATENT DOCUMENTS

| | | |
|---|---|---|
| DE | 3527309 A1 | 2/1987 |
| DE | 3714263 A1 | 10/1988 |
| DE | 4115568 A1 | 2/1993 |
| DE | 4236340 A1 | 5/1994 |
| DE | 4236340 C2 | 5/1994 |
| DE | 4342319 A1 | 6/1995 |
| DE | 4429656 C1 | 4/1996 |
| DE | 4446779 A1 | 6/1996 |
| DE | 19512107 B4 | 10/1996 |
| DE | 19512523 A1 | 10/1996 |
| DE | 19735624 C1 | 12/1998 |
| DE | 19723959 A1 | 1/1999 |
| DE | 19746919 A1 | 5/1999 |
| DE | 19801586 A1 | 7/1999 |
| DE | 19856937 A1 | 6/2000 |
| DE | 20002984 U1 | 8/2000 |
| DE | 19947368 C1 | 5/2001 |
| DE | 10013767 A1 | 10/2001 |
| DE | 10026175 A1 | 7/2002 |
| DE | 10112892 A1 | 10/2002 |
| DE | 10227253 A1 | 10/2003 |
| DE | 20209092 U1 | 11/2003 |
| DE | 10225005 C1 | 12/2003 |
| DE | 10326614 A1 | 12/2004 |
| DE | 10334736 A1 | 2/2005 |
| DE | 10334737 A1 | 2/2005 |
| DE | 10346105 A1 | 4/2005 |
| DE | 10349242 B3 | 4/2005 |
| DE | 102004009896 A1 | 9/2005 |
| DE | 102004012746 A1 | 10/2005 |
| DE | 10216422 B4 | 7/2006 |
| DE | 69929353 T2 | 9/2006 |
| DE | 102006006384 A1 | 9/2006 |
| DE | 102004031580 B4 | 2/2007 |
| DE | 102006049588 A1 | 8/2007 |
| EP | 0187526 A2 | 7/1986 |
| EP | 0187527 A2 | 7/1986 |
| EP | 0289868 A2 | 11/1988 |
| EP | 0608242 B1 | 8/1994 |
| EP | 0640255 B1 | 3/1995 |
| EP | 0681939 B1 | 11/1995 |
| EP | 0761493 A1 | 3/1997 |
| EP | 0666804 B1 | 9/1997 |
| EP | 0818868 B1 | 1/1998 |
| EP | 0962353 A1 | 12/1999 |
| EP | 0979176 B1 | 2/2000 |
| EP | 1011187 A1 | 6/2000 |
| EP | 1043186 A1 | 10/2000 |
| EP | 1043187 A1 | 10/2000 |
| EP | 1050094 B1 | 11/2000 |
| EP | 1095812 A1 | 5/2001 |
| EP | 1582395 A1 | 10/2005 |
| EP | 1610450 A2 | 12/2005 |
| EP | 1744443 A1 | 1/2007 |
| EP | 1956705 A1 | 8/2008 |
| GB | 638143 | 5/1950 |
| GB | 657035 | 9/1951 |
| GB | 657035 A1 | 9/1951 |
| GB | 657036 | 9/1951 |
| GB | 1280148 | 7/1972 |
| GB | 1390225 | 4/1975 |
| GB | 2236957 A | 4/1991 |
| GB | 2399465 A | 9/2004 |
| GB | 2461577 A | 1/2010 |
| GB | 2463692 A | 3/2010 |
| GB | 2463693 A | 3/2010 |
| JP | 5843104 A | 3/1983 |
| JP | 6376505 U | 5/1988 |
| WO | 9101232 A1 | 2/1991 |
| WO | 9217929 A1 | 10/1992 |
| WO | 9323908 A1 | 11/1993 |
| WO | 9323909 A1 | 11/1993 |
| WO | 9425304 A1 | 11/1994 |
| WO | 9511544 A1 | 4/1995 |
| WO | 9511545 A1 | 4/1995 |
| WO | 9530556 A2 | 11/1995 |
| WO | 9823017 A1 | 5/1998 |
| WO | 9908359 A1 | 2/1999 |
| WO | 0118936 A1 | 3/2001 |
| WO | 0171882 A1 | 9/2001 |
| WO | 0235676 A1 | 5/2002 |
| WO | 03052900 A2 | 6/2003 |
| WO | 03095282 A2 | 11/2003 |
| WO | 2004030975 A2 | 4/2004 |
| WO | 2004105226 A1 | 12/2004 |
| WO | 2007090500 A2 | 8/2007 |
| WO | 2007126321 A1 | 11/2007 |
| WO | 2009007666 A1 | 1/2009 |
| WO | 2009127938 A2 | 10/2009 |
| WO | 2010031596 A2 | 3/2010 |
| WO | 2010033584 A2 | 3/2010 |

OTHER PUBLICATIONS

Kazimierczuk et al., "Class-E Amplifier with an Inductive Impedance Inverter", IEEE Transactions on Industrial Electronics, Apr. 1990, pp. 160-166, vol. 37, No. 2.

Green et al., "10 kHz Inductively Coupled Power Transfer—Concept and Control", IEEE Power Electronics and Variable-Speed Drives, Oct. 1994, pp. 694-699, Conference Publication No. 399.

"Microgrid Powered Electric Vehicles: Wireless Energy Transfer Technology", Energy Transport Technologies, "http://ettek.com/images/TechWeb.pdf", published online by at least Dec. 17, 2007, pp. 1-14.

Sato et al., "A New Meander Type Contactless Power Transmission System—Active Excitation with a Characteristics of Coil Shape", IEEE Transactions on Magnetics, Jul. 1998, pp. 2069-2071, vol. 34, No. 4.

Meins et al., "Contactless High Power Supply", Sixth International Conference on Unconventional Electromechanical and Electrical Systems, Sep. 24-28, 2004, vol. 2, 7 pages.

Covic et al., "A Three-Phase Inductive Power Transfer System for Roadway-Powered Vehicles", IEEE Transactions on Industrial Electronics, Dec. 2007, pp. 3370-3378, vol. 54, No. 6.

* cited by examiner

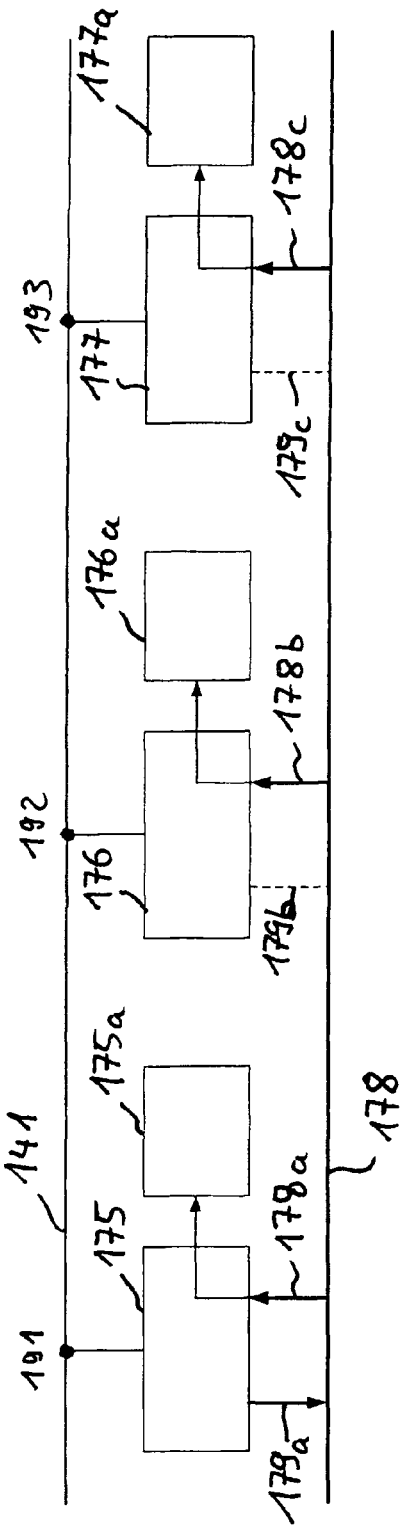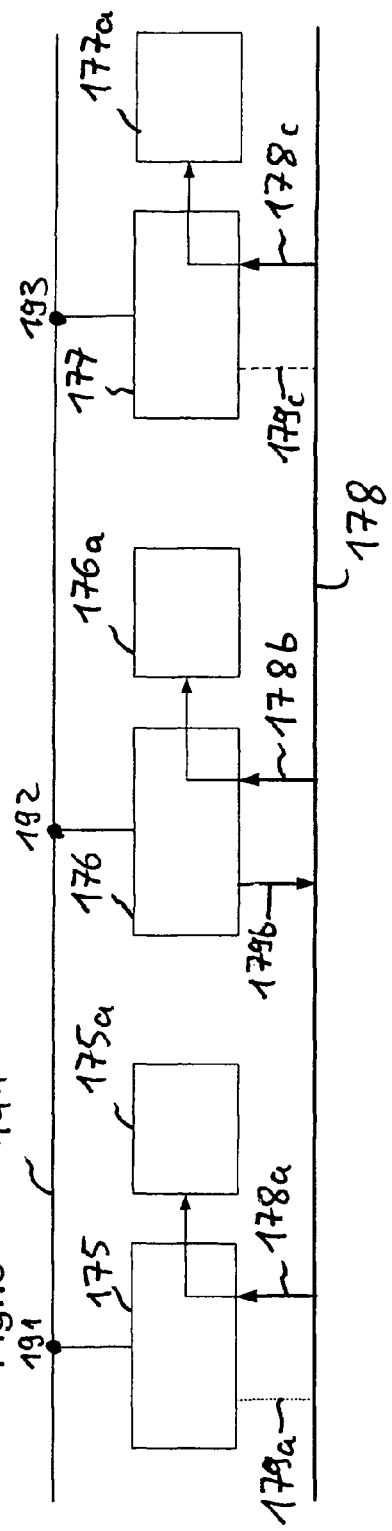

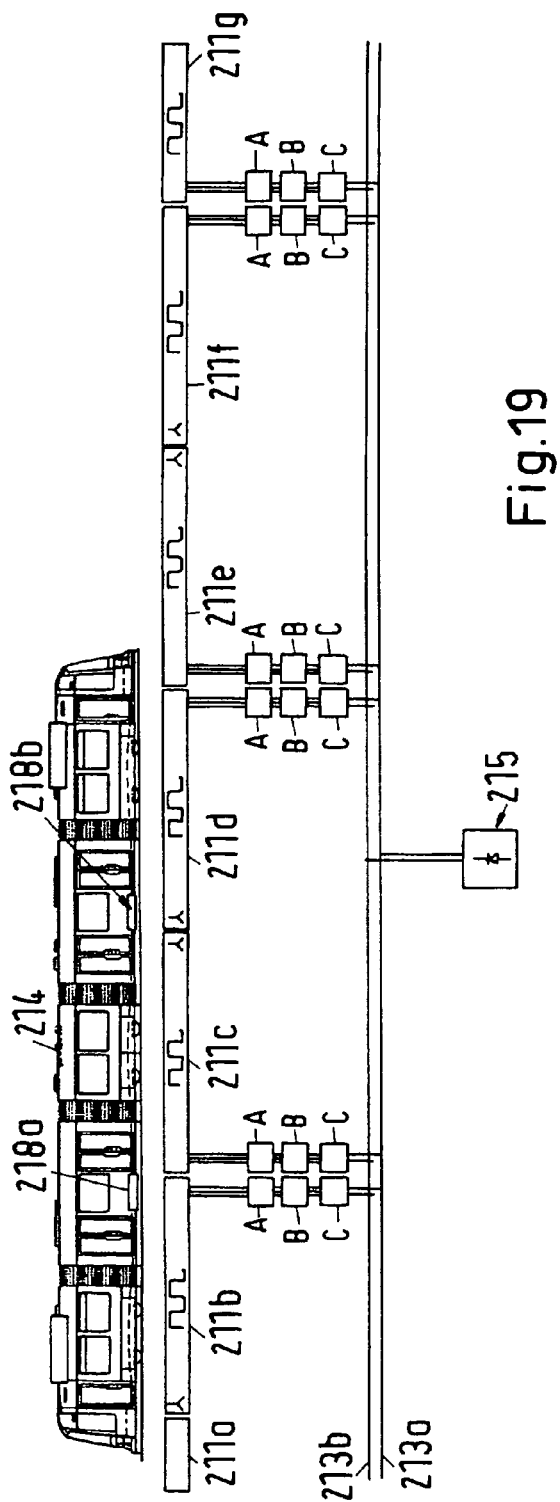
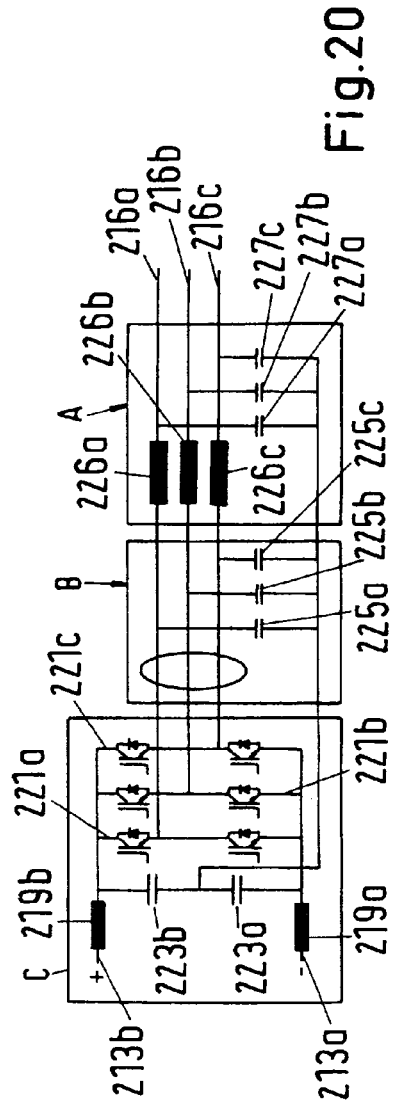
Fig.19
Fig.20

PRODUCING ELECTROMAGNETIC FIELDS FOR TRANSFERRING ELECTRIC ENERGY TO A VEHICLE

BACKGROUND OF THE INVENTION

1. Field of the Invention

The invention relates to a system and a method for transferring electric energy to a vehicle, in particular to a track bound vehicle such as a light rail vehicle (e.g. a tram).

2. Description of Related Art

In particular track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to transferring electric energy to a vehicle which is not necessarily (but preferably) a track bound vehicle. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

Track bound vehicles, in particular vehicles for public passenger transport, usually comprise a current collector (alternatively a device) for mechanically and electrically contacting a line conductor along the track, such as an electric rail or an overhead line. At least one propulsion motor on board the vehicles is fed with the electrical power from the external track or line and produces mechanical propulsion force.

Trams and other local or regional trains are operated usually via overhead lines within cities. However, especially in historic parts of cities, overhead lines are undesirable. On the other hand, conductor rails in the ground or near the ground cause safety problems.

WO 95/30556 A2 describes a road way-powered electric vehicle system. The all-electric vehicle has one or more on-board energy storage elements or devices that can be rapidly charged or energized with energy obtained from an electrical source, such as a network of electromechanical batteries. The energy storage elements may be charged while the vehicle is in operation. The charging occurs through a network of power coupling elements, e.g. coils embedded in the road way.

Placing the coils at selected locations along the length of the roadway has the disadvantage that the energy storage on board the vehicle needs a large storage capacity. In addition, if the vehicle does not reach the next coil in time, the vehicle might run out of energy for propulsion or other purposes. Therefore, at least for some applications, it is preferred to transfer energy to the vehicle continuously along the path of travel, i.e. along the track.

Inductively transferring energy from the track to the vehicle, i.e. producing electromagnetic fields, is subject to restrictions regarding EMC (electromagnetic compatibility). On one hand, electromagnetic fields may interfere with other technical devices. On the other hand, people and animals should not be subjected to electromagnetic fields permanently. At least, the respective limit values for field intensity must be observed.

SUMMARY OF THE INVENTION

The present invention provides a system and method for transferring electric energy to a vehicle, in particular to a track bound vehicle, which allows for continuous transfer of electric energy during travel and which facilitates meeting the respective limits for EMC.

According to a basic idea of the present invention energy is transferred from an electric conductor arrangement, which is arranged along the track, to the vehicle travelling on the track without having electric contact between the vehicle and the conductor arrangement. The conductor arrangement carries an alternating current which generates a respective electromagnetic field and the electromagnetic field is used to transfer the electric energy to the vehicle.

Preferably, the conductor arrangement is located in and/or under the track, for example under the surface of the ground on which the vehicle travels. However, the invention also includes the case that at least a part of the conductor arrangement is located sideways of the track, for example when the track is located in the country side or in a tunnel.

The frequency of the alternating current which flows through the conductor arrangement may be in the range of 5-100 kHz, in particular in the range of 10-30 kHz, preferably about 20 kHz.

The principle of transferring the energy by electromagnetic fields has the advantage that the conductor arrangement can be electrically isolated against contact. For example the wires or lines of the conductor arrangement can be buried in the ground. No pedestrian may unintentionally contact the buried lines. Furthermore, the problem of wear and tear of a current collector, which is used to contact standard overhead lines or live rails is solved.

As principally disclosed in WO 95/30556 A2, the vehicle which is travelling on the track may comprise at least one coil and the electromagnetic field generates an electric alternating voltage in the coil which can be used to operate any electric load in the vehicle, such as a propulsion motor, or can be used to charge an energy storage system, such as conventional batteries and/or super caps.

In order to reduce the electromagnetic fields where no vehicle is driving at a time, segments of the conductor arrangement, which segments are consecutive segments extending along the path of travel of the vehicle, may be operated where required only. For example, the lengths of the segments along the path of travel are shorter than the length of a vehicle in the travel direction and the segments may be operated only if a vehicle is already occupying the respective region of the path of travel along which the segment extends. In particular, occupied by a rail vehicle means that the vehicle is driving on the rails along which the segment extends. Preferably, the segments are operated only if the vehicle is fully occupying the respective region of the path of travel. For example, the rail vehicle is longer (in the direction of travel) than the segment and the vehicle's front and end are driving beyond the limits of the segment, if viewed from the center of the segment. Therefore it is proposed that the segment is switched on (i.e. the alternating current through the segment is starting to flow) before a receiving device of a vehicle for receiving the transferred energy enters the region of the path of travel along which the segment extends.

The most efficient way to transmit the energy, which is needed to produce the alternating current through the segment, is using a current supply line. If the supply line is carrying an alternating current, switches at the respective interfaces to the segment can be switched on to commence operating the segment.

However, an alternating current in the supply line also causes an electromagnetic field. This field can be shielded from the environment, e.g. by burying the supply line in the ground and/or by using metal shields.

The present invention proposes an alternative way: The current in the supply is a direct current and switches connecting the supply line with the alternating current line(s) of the segment are part of an inverter. The inverter produces the alternating current by repeatedly switching on and off the switches. Preferably, each inverter is placed directly at the end of a segment. In other words: the concept of the present invention is to produce the alternating current locally and preferably where and when necessary.

If a segment is not to be operated, the switches of the inverter are not operated, i.e. are permanently switched off. Since the supply line carries a direct current, the supply line does not produce an alternating electromagnetic field. Furthermore, only those segments which are switched on (i.e. which are fed by the inverter/inverters) are producing electromagnetic fields. Therefore, the EMC standards can be met easily and the losses of electric energy are reduced to a minimum. It is a basic idea of the present invention, that the effort for providing and operating switches as parts of inverters is not significantly higher than for providing and operating switches between an alternating current supply line and the segments. The number of switches can even be reduced. For example, the arrangement according to FIG. 11 having a three-phase AC power supply line and having segments with three phases comprises nine switches at each interface between consecutive segments. The corresponding arrangement according to FIG. 12 having a DC for supply line and also having segments with three phases only requires six switches at each interface between consecutive segments.

Using a DC power supply line overcomes the disadvantage of an alternating current power supply line that alternating current lines comprise an inductance which needs to be compensated, e.g. by capacities at regular intervals along the path of travel. Since the current in the DC supply line is a direct current, losses due to any inductance compensation do not occur.

A further problem of alternating current supply lines relates to the way the AC supply line is energized. A constant current source may be connected to the AC supply line and produces a constant current, no matter of the size of the electric load. On the other hand, the losses in the AC supply line are also independent of the load, i.e. electric losses happen all the time. Furthermore, it is necessary to design all elements of the AC supply line, such as cables, switches and filters for prominent operation.

A DC supply line does not produce losses when no current is withdrawn and converted into an alternating current in the segments. Filters for filtering undesired frequencies are not required for the DC supply line.

When an AC supply line is used which is fed by a constant current source, it would be difficult to detect a short circuit. A short circuit in a PC supply line is less likely and can be detected easily.

The DC supply line can be fed with electric energy in the same manner as standard DC supply lines (such as live rails) which are to be contacted by a sliding contactor of a vehicle.

In particular, the following is proposed: A system for transferring electric energy to a vehicle, in particular to a track bound vehicle such as a light rail vehicle, wherein
- the system comprises an electric conductor arrangement for producing an alternating electromagnetic field and for thereby transferring the energy to the vehicle,
- the electric conductor arrangement comprises at least one alternating current line, wherein each alternating current line is adapted to carry one phase of an alternating electric current,
- the conductor arrangement comprises a plurality of consecutive segments, wherein the segments extend along the path of travel of the vehicle, each segment comprising one section of each of the at least one alternating current line,
- the system comprises a direct current supply line for supplying electric energy to the segments,
- each segment is connected to the supply line via at least one inverter which is adapted to invert a direct current carried by the supply line to an alternating current carried by the at least one alternating current line.

In particular, the supply line may extend along the path of travel or track of the vehicle. For example, the supply line may extend substantially in parallel to the rails of a railway. The inverters may be distributed over the part of travel to connect the supply line with the segments of the electric conductor arrangement which produces the electromagnetic field.

A segment is understood to be a part of the conductor arrangement, wherein each segment produces an electromagnetic field for transferring energy to a vehicle, provided that the segment is switched on, i.e. is operated. In particular, each segment may consist of sections of the at least two lines of the conductor arrangement, wherein each line is adapted to carry a different one of the phases of the alternating electric current.

Furthermore, a method for transferring electric energy to a vehicle, in particular to a track bound vehicle such as a light rail vehicle, is proposed wherein
- an electromagnetic field is produced by an electric conductor arrangement thereby transferring the electric energy to the vehicle,
- the electromagnetic field is produced by conducting an alternating current through at least one of consecutive segments of the conductor arrangement, wherein the segments extend along the track,
- the alternating current is limited to a specific segment or to a specific row of consecutive segments of the conductor arrangement by operating or not operating at least two of a plurality of inverters which connect, in each case, a direct current supply line to one interface between two consecutive segments in order to generate the electromagnetic field in a restricted region of the path of travel of the vehicle.

Preferably, the electric conductor arrangement comprises three lines, each line carrying a different phase of a three-phase alternating current. However, it is also possible, that there are only two or that there are more than three-phases carried by a corresponding number of alternating current lines. In particular, each of the segments may comprise sections of each of the lines, so that each segment produces an electromagnetic field which is caused by the three (or other number of) phases. For example, in the case of a three-phase system, the phase shift may be 120°, as usual. The alternating current in each phase may be a sinusoidal or nearly sinusoidal current produced by the inverter or inverters. Regarding the operation of the inverters, in particular regarding the method of controlling the switches of the inverter, reference is made to the control of propulsion motors of railway traction vehicles, for example. Each switch may be controlled by a drive unit which controls the timing of individual processes of switching on and switching off the switch. However, the drive units may be controlled by a higher-level control device of the inverter which coordinates the timing of all drive units. This control device may receive a synchronization signal in order to synchronize the operation of different inverters. However, alternatively, the synchronization of different inverters may be performed by a single control device by directly controlling the drive units or by transferring synchronization signals to each control device of the inverters to the synchronized. This means that, preferably, there is at least one control device for a plurality of inverters and this higher-level control device controls directly or indirectly the operation of the switches of the inverters. This control device may be the control device of a specific inverter and all inverters may have such a control device. In this case, the higher-level control device controls the switches indirectly via the control device of the inverter. Alternatively, there may be only one of the higher-level control devices for controlling the switches directly.

More generally speaking, the architectures for the control of the inverter switches may be realized in different manner in different embodiment of the invention. In any case, synchronizing the switching processes performed by the switches of different inverters is preferred, as will be described in more detail below.

Synchronizing does not necessarily mean that the switching processes of different inverters are performed at the same time. Rather, the synchronization may cause a phase shift of the alternating voltage produced by different inverters. For example, a first inverter at a first end of a segment may produce a first alternating voltage (or more precisely speaking: an electric potential) and a second inverter at the opposite end of the segment may produce a second alternating voltage. These alternating voltages may have a phase shift of 180°, for example. Consequently, an alternating current is produced in the segment.

On the other hand, the first and the second inverter may be synchronized in such a manner that there is no phase shift of the alternating voltages at the opposite ends of the segment. In this case, no alternating current in the segment is produced. However, if the operation of one of the inverters is stopped (i.e. the switches of the inverter are no longer switched on and off), the other inverter and a further inverter at another segment may cause an alternating current through a consecutive row of segments. Therefore, according to a first embodiment, the phase lines in consecutive segments are connected in series to each other or can be switched in series to each other.

In particular, the system may be adapted to start an operation of a third inverter in order to cause the alternating current to flow through an extended row of consecutive segments, wherein the third inverter connects the supply line to a third end of the section(s) of another segment, wherein the third end is located further away along the track from the first end than the second end and is located at the end of the extended row of consecutive segments and wherein the system is adapted to synchronize the third inverter with the second inverter so that the second and third inverter are operated with no phase shift. As a result, there is no alternating current in the segment or segments between the second end and the third end. However, as soon as the second inverter is switched off (i.e. the operation of the second inverter stops), an alternating current is produced between the first end and the third end through the extended row of consecutive segments, if there is a phase shift between the first inverter and the third inverter.

In a later step, the second inverter may be switched on again and may be operated at a phase shift compared to the third inverter and with no phase shift compared to the first converter. Therefore, the alternating current between the first end and the second end stops flowing, but there is still an alternating current between the second end and the third end. Consequently, the first inverter may be switched off.

The procedure described in the preceding paragraphs may be repeated for further segments along the path of travel, thereby producing alternating currents in segments where a vehicle is travelling. In particular, as described elsewhere in this description, the alternating current may be produced by segments in regions only which are occupied by a vehicle.

It is particularly preferred that the sections of the path of travel (along which the segments extend) are shorter than the length of a vehicle on the track in the travel direction and that the system is adapted to operate (and in particular to switch on) segments only if a vehicle is occupying the respective section of the track where the segment is located. Since only segments under (or in some cases like in tunnels sideways of) the track are switched on, the vehicle shields the environment from the electromagnetic field which is produced by the conductor arrangement. Preferably, only segments are operated which are fully occupied by a vehicle, i.e.—in lengthwise direction along the path of travel—the operated segments do not extend beyond the front of the vehicle and do not extend beyond the end of the vehicle.

Most preferred, segments are operated in such a manner that there is continuous transfer of electric energy from the segments to the vehicle while the vehicle is travelling along the path of travel. Therefore, the segments may be part of a row (i.e. a series) of consecutive segments, wherein the row extends along the path of travel. This means that a first segment which is occupied by the vehicle may be operated and before the vehicle (or before the receiving device of the vehicle) enters the next following segment of the row, this next following segment is switched on. On the other hand, the first segment may be switched off after the vehicle has left the corresponding section of the path of travel.

A "corresponding section" is understood to be a section which has—in lengthwise direction along the path of travel—the same extension as the corresponding segment of the conductor arrangement. "Continuous transfer of electric energy" means that the receiving device of the vehicle is always in a section when the corresponding segment is operated (i.e the lines of the segment carry an alternating current for producing an electromagnetic field in order to provide energy to the vehicle). It might happen that there is a short interruption (e.g. of some milliseconds) of the current flow through the lines when a consecutive segment is switched on or when the first segment is switched off (i.e if the operation of an inverter starts or is stopped). Despite that, the transfer of electric energy is "continuous", since the receiving device of the vehicle is located in a section when the corresponding segment is operated. However, it is preferred that the transfer of electric energy is also interruption-free. Examples of such an interruption-free transfer will be described below. Interruption-free transfer is particularly easy to achieve if the lines of the consecutive sections are connected in series to each other. Therefore, according to a first embodiment, the conductor arrangement is arranged in such a manner that at least two consecutive segments can be operated at the same time, wherein corresponding lines for carrying the same phase of the alternating current in the consecutive sections are connected in series to each other. For example, the interface between the consecutive segments may comprise a switch an arrangement or switches which may connect or disconnect the corresponding lines. However, it is preferred that the phase lines of consecutive segments are permanently connected in series to each other and that the operation of the segments is controlled by operating (or by not operating) the respective inverters.

According to a second embodiment, the lines for carrying the same phase of the alternating current in the consecutive sections are not connected to each other. An advantage of this embodiment is that non-active segments do not produce electromagnetic fields at all, since they are de-coupled from active segments. An example will be described with reference to the figures.

The number of consecutive segments which are operated at the same time is not restricted to two. Rather, three or more consecutive segments can be operated at the same time, for example if a long vehicle is travelling on the path, such as a vehicle having receiving devices at different locations. In this case, it is preferred that segments are switched off only when the last receiving device has left the section of the path which corresponds to the segment.

The process of starting or stopping the operation of segments may be controlled using at least one of the phase lines of the segments. Preferably, the occupation of a respective section of the track by a vehicle may be detected, in particular by detecting a voltage and/or a current in the lines of the segment which is caused by inductive coupling of the vehicle to the lines and/or which is caused by electromagnetic fields produced by the vehicle. Correspondingly, a measurement device may be connected to at least one of the lines. Preferably, a plurality of or all of the lines of the segment is connected to a measurement device and/or to the same measurement device. The measurement device or devices is/are adapted to detect the occupation of the respective section of the track by a vehicle by detecting a voltage and/or a current in the line or a separate loop which is caused by inductive coupling of the vehicle to the line and/or which is caused by electromagnetic fields produced by the vehicle.

The system may be adapted to switch on a segment before a receiving device of a vehicle for receiving the transferred energy enters the section of the path of travel where the segment is located.

For example, the length of the segments may be dimensioned in such a manner, that at least two of the segments are covered lengthwise by a vehicle on the track, i.e. the minimum length of a vehicle on the track is twice as long as the length of one segment (preferably, all line segments have the same length). As a result, the receiving device or receiving devices of the vehicle for receiving the transferred energy may be located in the middle section of the vehicle in lengthwise direction. Furthermore, it is preferred that only segments are switched on, which are fully covered by a vehicle on the track. On the other hand, the event that a vehicle is entering the region above a particular line segment can be detected (as mentioned above) and this line segment is switched on, as soon as the vehicle enters the region above the next following line segment.

Accordingly, segments are switched off before the vehicle leaves the region above the line segment. Preferably they are switched off before they are no longer fully covered by the vehicle.

If the conductor arrangement comprises more than one alternating current line (i. e. the phase lines), detecting the events that the vehicle enters or leaves a particular line segment, can be performed using one of the lines only. However, the other lines can be switched on and off correspondingly, i.e. the conductor arrangement comprises sections, wherein all lines in other sections can be switched on and off together.

According to a preferred embodiment of the invention, at least one of the lines in at least one of the segments (preferably all lines in all of the segments) may be arranged in such a manner that the line produces—at each point in time while the alternating electric current is flowing through the line—a row of successive magnetic poles of an electromagnetic field, wherein the successive magnetic poles have alternating magnetic polarities. The row of successive magnetic poles extends in the travel direction of the vehicle which is defined by the track or by the path of travel. Alternatively, the at least one line comprises a plurality of sections which extend transversely to the travel direction of the vehicle which is defined by the track or path of travel. In this case, the sections of the same line are arranged in a row along the path of travel (e.g. the track) in such a manner that—at each point in time while an alternating electric current is flowing through the line—the alternating current flows through successive sections in the row alternatingly in opposite directions.

The magnetic poles produced by the lines and/or the sections of the different lines are—at each point in time—in a repeating sequence extending in the travel direction, wherein the repeating sequence corresponds to a sequence of the phases. For example in the case of a three-phase alternating current, having the phases U, V, W, a section carrying phase U is followed by a section carrying phase V which in turn is followed by a section carrying phase W and this sequence of phases U, V, W is repeated several times in the direction of the track, i.e. in the travel direction. An example will be described later with reference to the attached figures.

In the preferred embodiment of the invention which is mentioned above, the at least one line produces—at each point in time while the alternating electric current is flowing through the line—a row of successive magnetic poles of an electromagnetic field, wherein the successive magnetic poles have alternating magnetic polarities. In other words: At a given point in time the alternating current in the line produces—in the direction of travel—a magnetic field having a magnetic field vector which is oriented in a first direction in a first region of the line, followed by a second region of the line where the field vector of the magnetic field is oriented in the opposite direction of the first direction, followed by another region of the line where the magnetic field vector is oriented again in the first direction and so on. However, it is not always the case that the first direction and the direction of the magnetic field vector in the following region of the line are exactly oriented in opposite direction. One reason may be that the line is not arranged exactly in a regular, repeating manner. Another reason may be non-symmetrical influences of other lines of the conductor arrangement. A further reason may be external electromagnetic fields. Also, the vehicle which is travelling on the track will influence the resulting electromagnetic field.

However, the principle of alternating magnetic poles produced by the same line of the conductor arrangement at each point in time has the advantage that the resulting electromagnetic field strength sideways of the conductor arrangement has a very small intensity which decreases rapidly with increasing distance to the conductor arrangement. In other words, the oppositely oriented magnetic fields in the regions of the line are superimposed sideways of the line and compensate each other. Since it is desirable to have very small electromagnetic field strength on both sides of the track, it is preferred that the at least one line of the electric conductor arrangement is located in and/or under the track wherein the sections of the line which extend transversely to travel direction extend in a horizontal plane. In this context, "horizontal" also covers the case that the track may form a bent and is slightly inclined. Correspondingly the respective "horizontal" plane of the line sections may also be inclined slightly. Horizontal is therefore referred to the standard case that the track is extending in a horizontal plane. The same applies to the case that the path of travel or track is leading upwardly onto a hill or downwardly from the hill. Some percentages of inclination of the path are negligible for the compensation of the magnetic fields sideways of the path.

Since the field intensity sideways of the path is very small, energy can be transferred to the vehicle at high power and EMC limit values (e.g. 5 uT for the sideways magnetic field intensity) can be met easily at the same time.

According to a particularly preferred embodiment, the at least one line in the at least one segment of the electric conductor arrangement extends along the path of travel or track in a serpentine manner, i.e. sections of the line which extend in the direction of travel are followed in each case by a section which extends transversely to the travel direction which in turn is followed again by a section which extends in the direction of travel. In case of a plural-phase system preferably all lines of the conductor arrangement are arranged in this manner. The line may be realized by a cable.

The expression "serpentine" covers lines having a curved configuration and/or having straight sections with sharply bent transition zones to neighbouring sections. Straight sections are preferred, since they produce more homogenous fields.

In particular, the alternating current in the at least one line of the at least one segment produces an electromagnetic wave which moves in or opposite to the direction of travel with a velocity proportional to the distance of consecutive magnetic poles of the line and proportional to the frequency of the alternating current. Preferably, at least some of the sections which extend transversely to the travel direction, and preferably all of these sections, extend over a width which is greater than the width of a receiving device of a vehicle on the track for receiving the transferred energy. For example, the width of the sections may be greater than maximum width of the vehicles which may occupy the track.

One advantage of the embodiment is that the alternating current which flows through the sections produces a nearly homogenous intensity of the magnetic field in the region where the receiving device may be located.

Preferably, the electric conductor arrangement is located under the track, e.g. under ground.

The at least one line comprises an inductivity which is used to transfer the electric energy to the vehicle or vehicles and further comprises a leakage inductivity which does not contribute to the energy transfer to the vehicle or vehicles, wherein the leakage inductivity is compensated by a capacity located in the same line so that the resulting impedance of the capacity and the leakage inductivity is zero. Such a zero impedance has the advantage that the reactive power of the system is minimized and, therefore, the design of the active power components is minimized as well. For example, the compensating capacity may be located at one end of each phase line of a segment.

Principles and details regarding the reception of energy within the vehicle will be described with reference to the attached figures. However, some features are described in the following: The receiving device of the vehicle may comprise a coil of a conductor or of conductors or it may comprise a plurality of coils. The advantage of plural coils of a plural phase receiving device is that it is easier and means less effort to smooth the fluctuations of the received currents or voltages.

Preferably, the at least one coil is positioned only a few centimetres above the primary side conductor arrangement, because the magnetic coupling between primary and secondary coils will decrease with increasing distance. E.g., the at least one coil is positioned not more than 10 cm above the ground, preferably not more than 5 cm and most preferred 2-3 cm above the ground. In particular, this applies if the conductor arrangement is located under the ground. The line or lines of the conductor arrangement may be located not more than 2 cm below the surface of the ground, preferably not more than 1 cm.

Preferably, the receiving device which receives the transferred energy is movable in vertical direction so that it can be brought in a position closely above ground and it can be lifted into a higher position when the receiving device is not used.

Preferably, the receiving device comprises a plurality of coils which are arranged at different positions in the direction of the travel. For example, the distance between the coils may be equal to the distance of the sections of different phases of the conductor arrangement along the track, wherein these sections are sections which extend transversely to the travel direction. However, it is not necessary to place the different coils of the vehicle at the same distance to each other like the distance of the sections.

BRIEF DESCRIPTION OF THE DRAWINGS

Embodiments and examples of the present invention will now be described with reference to the attached figures. The figures show.

DETAILED DESCRIPTION OF THE PREFERRED EMBODIMENTS

Figure 1:
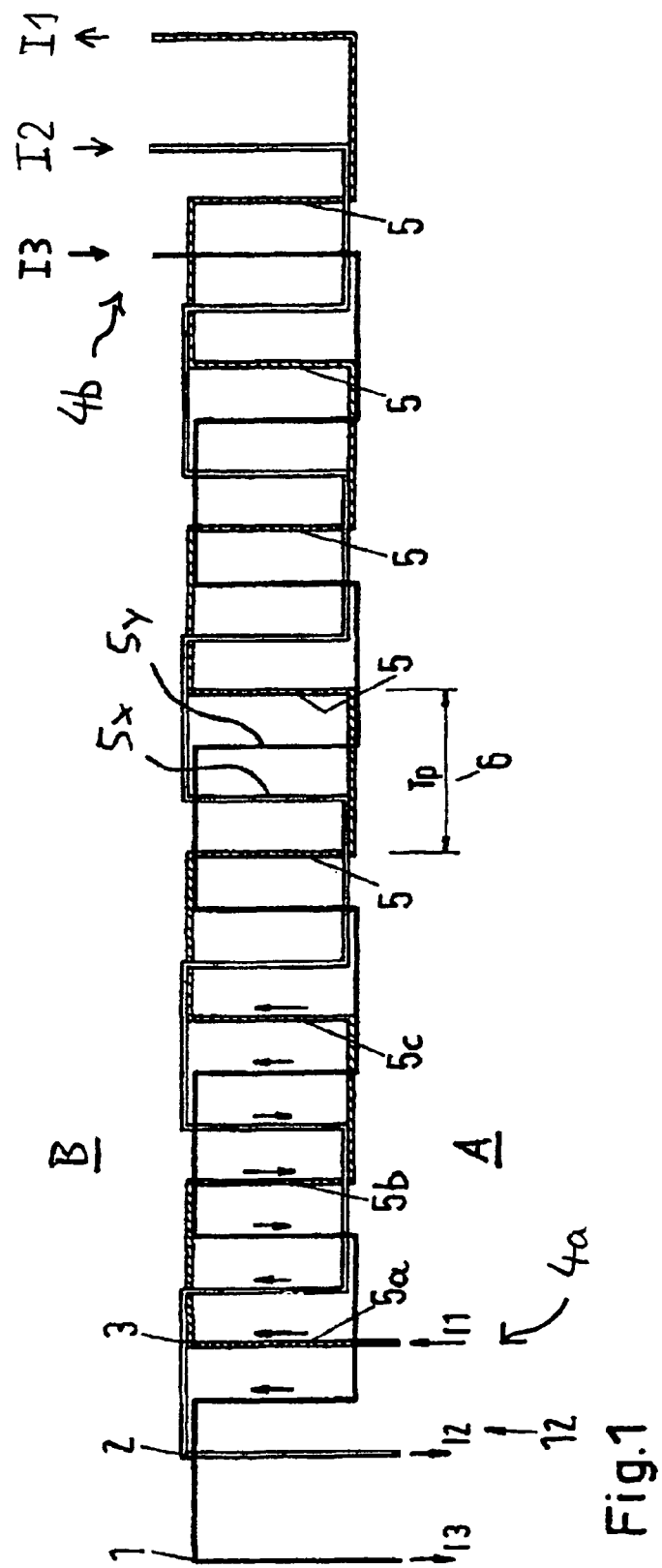
FIG. 1 schematically a three-phase conductor arrangement which extends along a track, FIG. 2 a diagram showing alternating currents through the three-phases of the arrangement according to FIG. 1 as functions of time, FIG. 3 magnetic field lines of a magnetic field, which is produced by the conductor arrangement according to FIG. 1, while a receiving device of a vehicle is located above the shown region of the conductor arrangement, wherein the direction of travel of the magnetic field distribution extends in the plane of the figure from right to left or from left to right, FIG. 4 another diagram showing a region of the magnetic field which is produced by the conductor arrangement, while a load is connected to the receiving device in the vehicle, FIG. 5 a diagram showing schematically the movement of the magnetic wave produced by the conductor arrangement along the track and showing the movement of the receiving device due to the movement of the vehicle on the track, FIG. 6 a circuit diagram showing a receiving device of a vehicle having coils for three different phases, wherein the receiving device is connected to an AC/DC-converter, FIG. 7 a rail vehicle which is travelling on a track along which a conductor arrangement extends, FIG. 8a-c three consecutive points in time of a situation in which a rail vehicle travels on a track, wherein the track is provided with a plurality of consecutive line segments of a conductor arrangement, wherein the line segments can be switched on and off for providing the vehicle with energy, FIG. 9 an arrangement similar to the arrangement shown in FIG. 8 including a circuit diagram of a conductor arrangement along the track, wherein the conductor arrangement comprises line segments which can be switched on and off, and FIG. 10 an arrangement similar to the arrangement shown in FIG. 1, schematically illustrating a conductor arrangement between two rails of a railway, FIG. 11 an arrangement having an AC power supply line and switches for connecting interfaces between segments with the supply line, FIG. 12 a preferred arrangement having segments for transferring electric energy to a vehicle, wherein the segments are connected to a DC power supply line via inverters at interfaces between the segments, FIG. 13 schematically a rail vehicle travelling along a track with a plurality of consecutive segments, wherein an inverter is arranged at each interface between two consecutive segments, FIG. 14 an arrangement similar to the arrangement shown in FIG. 12 illustrating the operation state at a first point in time, FIG. 15 the arrangement of FIG. 14 at a point in time when the receiving device of a vehicle has travelled along one of the segments and the operation of a consecutive segment is prepared, FIG. 16 the arrangement of FIGS. 14 and 15, wherein the receiving device has been moved to the consecutive segment and the inverter at the interface between the two consecutive segments is operated in a different operating state compared to the state shown in FIG. 15, FIG. 17 schematically a DC power supply line and a plurality of control units for controlling the operation of inverters between consecutive segments illustrating a first operating state of the controllers, FIG. 18 the arrangement of FIG. 17 in a second operating state, FIG. 19 Schematically an arrangement comprising consecutive segments, wherein the lines of the segments for carrying the phases of the alternating current are not connected in series to each other, and FIG. 20 a constant current source for producing a constant alternating current in one of the consecutive segments.
Figure 10:
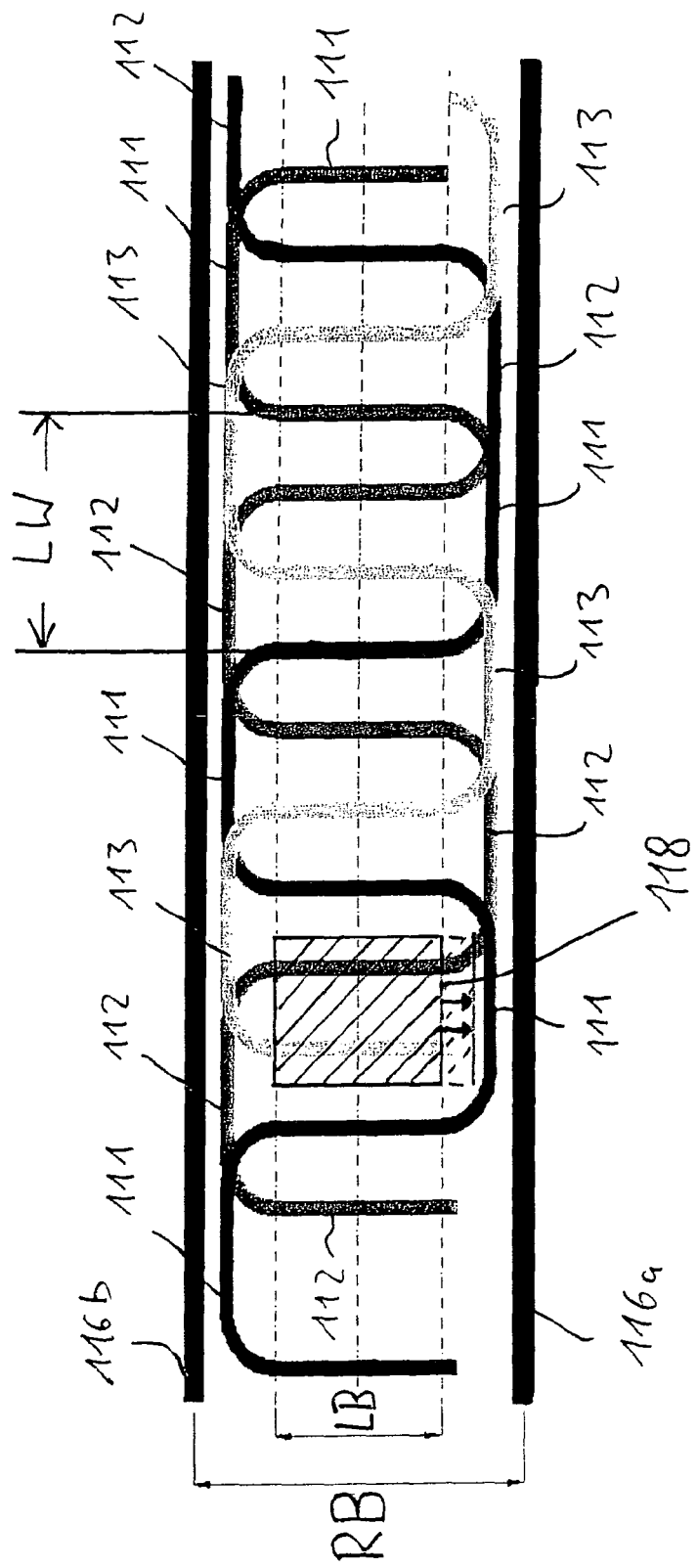

FIG. 1 shows a conductor arrangement which may be located underground along a track, for example along the rails of a railway (see the arrangement shown in FIG. 10, for example). In the latter case, the rails extend from left to right in the view of FIG. 1. The arrangement shown in FIG. 1 may be one segment of a plurality of segments of the total conductor arrangement extending along the path of travel.

FIG. 1 is understood to be a schematic view. The conductor arrangement shown in FIG. 1 comprises three lines 1, 2, 3 extending (in the direction of travel which extends from left to right or right to left in FIG. 1) between a first end 4a and a second end 4b. Each line comprises sections which extend transversely to the direction of travel. Only some of the transversely extending sections of lines 1, 2, 3 are denoted by reference numerals, namely three sections 5a, 5b and 5c of line 3, some further sections of the line 3 denoted by "5", one section 5x of line 2 and one section 5y of line 1. In the most preferred case, the arrangement 12 shown in FIG. 1 is located underground of the track so that FIG. 1 shows a top view onto the arrangement 12. In this case, the rails of a railway may extend from left to right, at the top and the bottom in FIG. 1, i.e. the transversely extending line sections may be completely within the boundaries defined by the rails (see also FIG. 10). For example in the manner shown in FIG. 12-18, the three lines 1, 2, 3 may be connected to a DC (direct current) supply line via inverters, wherein the supply line extends along the path of travel of the vehicle and may feed other segments with electric energy as well.

At the time which is depicted in FIG. 1, a positive current I1 is flowing through line 3. "Positive" means that the current flows from left to right in FIG. 1 between the ends 4a, 4b of the segment. Since the lines 1, 2, 3 are phase lines of a three-phase alternating current, at least one of the other currents, here the current I2 through the line 2 and the current I3 through the line 1, are negative, or more generally speaking, are flowing in the opposite direction. The directions of the currents through lines 1, 2, 3 are indicated by arrows.

Figure 12:
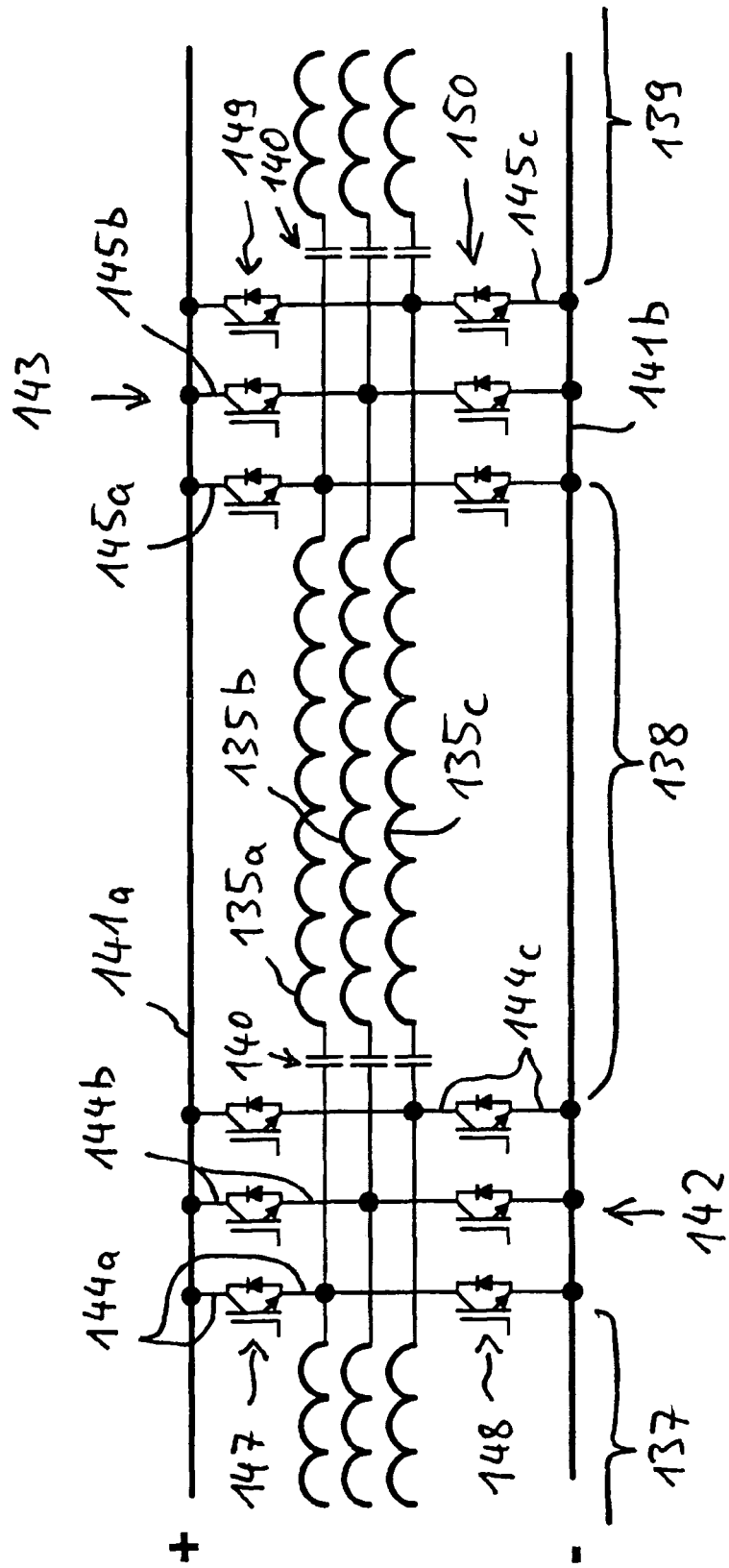

An inverter (not shown in FIG. 1) may be located at each end of the three lines 1, 2, 3 shown in FIG. 1. The inverters may be synchronised to produce a phase shift of the electric potential at the opposite ends of the segment. When the arrangement shown in FIG. 1 is one of a plurality of segments of the total conductor arrangement, the lines 1, 2, 3 may also be connected to corresponding phase line of a consecutive segment (for example as shown in FIG. 12.

The sections of line 3 and the corresponding sections of lines 1, 2 which extend transversely to the direction of travel preferably have the same width and are parallel to each other. In practice, it is preferred that there is no shift in width direction between the transversely extending sections of the three lines. Such a shift is shown in FIG. 1 for the reason that each section or each line can be identified.

Preferably, each line follows the same serpentine-like path along the track, wherein the lines are shifted in the direction of travel by one third of the distance between consecutive sections of the same line extending transversely to the direction of travel. For example, as shown in the middle of FIG. 1, the distance between consecutive sections 5 is denoted by $T_P$. Within the region between these consecutive sections 5, there are two other sections which extend transversely to the direction of travel namely, section 5x of line 2 and section 5y of line 1. This pattern of consecutive sections 5, 5x, 5y repeats at regular distances between these sections in the direction of travel.

The corresponding direction of the current which flows through the sections is shown in the left region of FIG. 1. For example, section 5a carries a current from a first side A of the arrangement 12 to the opposite side B of the arrangement. Side A may be one side of the track (such as the right hand side in the direction of travel, when viewed from a travelling vehicle) and side B is the opposite side (e.g. the left side of the track), if the arrangement 12 is buried in the ground under the track, or more generally speaking, extends in a horizontal plane.

The consecutive section 5b consequently carries an electric current at the same time which is flowing from side B to side A. The next consecutive section 5c of line 3 is consequently carrying a current from side A to side B. All these currents have the same size, since they are carried by the same line at the same time. In other words: the sections which extend transversely are connected to each other by sections which extend in the direction of travel.

As a result of this serpentine like line arrangement the magnetic fields which are produced by sections 5a, 5b, 5c, . . . of the line 3 produce a row of successive magnetic poles of an electromagnetic field, wherein the successive magnetic poles (the poles produced by section 5a, 5b, 5c, . . . ) have alternating magnetic polarities. For example, the polarity of the magnetic pole which is produced by section 5a may correspond at a specific point in time to a magnetic dipole, for which the magnetic north pole is facing upwardly and the magnetic south pole is facing downwardly. At the same time, the magnetic polarity of the magnetic field which is produced by section 5b is oriented at the same time in such a manner that the corresponding magnetic dipole is facing with its south pole upwardly and with its north pole downwardly. The corresponding magnetic dipole of section 5c is oriented in the same manner as for section 5a and so on. The same applies to lines 1 and 2.

However, the present invention also covers the case that there is only one phase, that there are two phases or that there are more than three phases. A conductor arrangement having only one phase may be arranged as line 3 in FIG. 1. The ends of a line 3 may therefore be connected to a DC supply line via one-phase inverters. A two-phase arrangement may consist of lines 3 and 2, for example, but the distance between the transversely extending sections of the two lines (or more generally speaking: of all lines) is preferably constant (i.e. the distances between a transversely extending section of line 3 to the two nearest transversely extending section of line 2—in the direction of travel and in the opposite direction—are equal).

FIG. 10 is intended to illustrate some exemplary dimensions of the conductor arrangement, for example the conductor arrangement shown in FIG. 1. Only parts of the three lines 111, 112, 113 (which may correspond to lines 1, 2, 3 of FIG. 1) are shown in FIG. 10 and connections to inverters or to lines of consecutive segments are omitted.

The serpentine like lines 111, 112, 113 are located between two rails 116a, 116b of a railway for railway vehicles (such as regional or local trains, such as a tram). The expression "between" is related to the top view shown in FIG. 10. For example, the lines 111, 112, 113 may be located below the level of the rails 116.

Each of the lines 111, 112, 113 comprises linear sections which extend transversely to the direction of the track, i.e. the longitudinal direction of the rails 116. These transversely extending sections are connected to the consecutive transversely extending sections of the same line via longitudinally extending sections, which extend in the longitudinal direction of the rails. The transversely and linearly extending sections have a length LB, which is preferably at least as large as half the distance RB between the rails. For example, the distance RB may be 1 m and the length of the transversely extending sections may be 50 cm or in the range of 50 to 75 cm.

The transversely extending sections and the longitudinally extending sections of the same line are connected to each other by curved sections. The curvature corresponds, for example, to the curvature of a circle having a radius of 150 mm.

FIG. 10 also schematically shows a shaded area 118 which is covered by a coil of a receiving device of a vehicle travelling on the rails 116. The width of the coil is equal to the lengths of the transversely extending sections of the lines. However, in practice, it is preferred that this width is smaller than the length of the transversely extending sections. This allows for a shift in the position of the coil in the direction transverse to the travel direction, as indicated by two arrows and a line below the shaded area 118. Such a shift would not influence the reception of energy by the coil, if the shift would not move the coil beyond the boundaries of the transversely extending sections.

As follows from the time dependent diagram shown in FIG. 2, the currents through the phases 1, 2, 3 of FIG. 1 may be phase currents of a conventional three-phase alternating current. L1, L2, L3 in FIG. 2 denote that the serpentine like lines 1, 2, 3 form inductivities.

Figure 2:
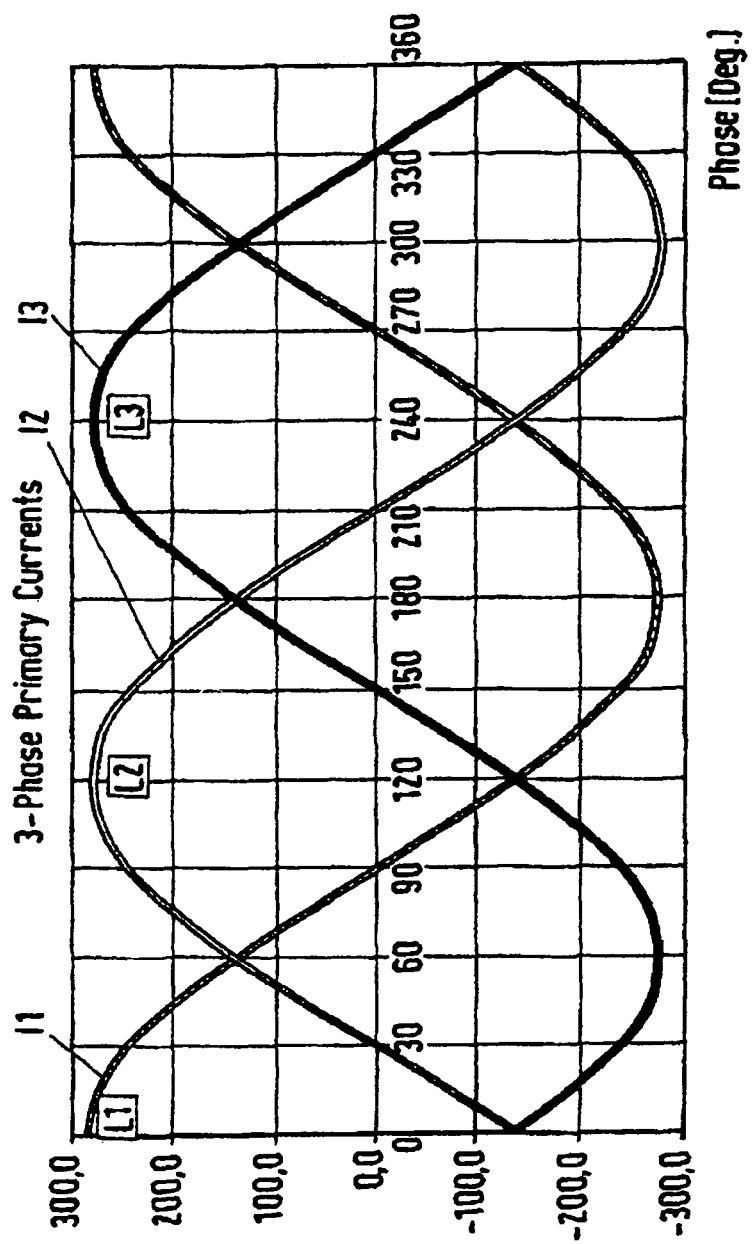

As shown in FIG. 2, the peak current value of the currents may be in the range of 300 A respectively −300 A. However, greater or smaller peak currents are also possible. 300 A peak current is sufficient to provide propulsion energy to a tram for moving the tram along a track of some hundred meters to a few kilometres, for example within the historic town centre of a city. In addition, the tram may withdraw energy from an on-board energy storage, such as a conventional electrochemical battery arrangement and/or a super cap arrangement. The energy storage may be charged again fully, as soon as the tram has left the town centre and is connected to an overhead line.

Figure 3:
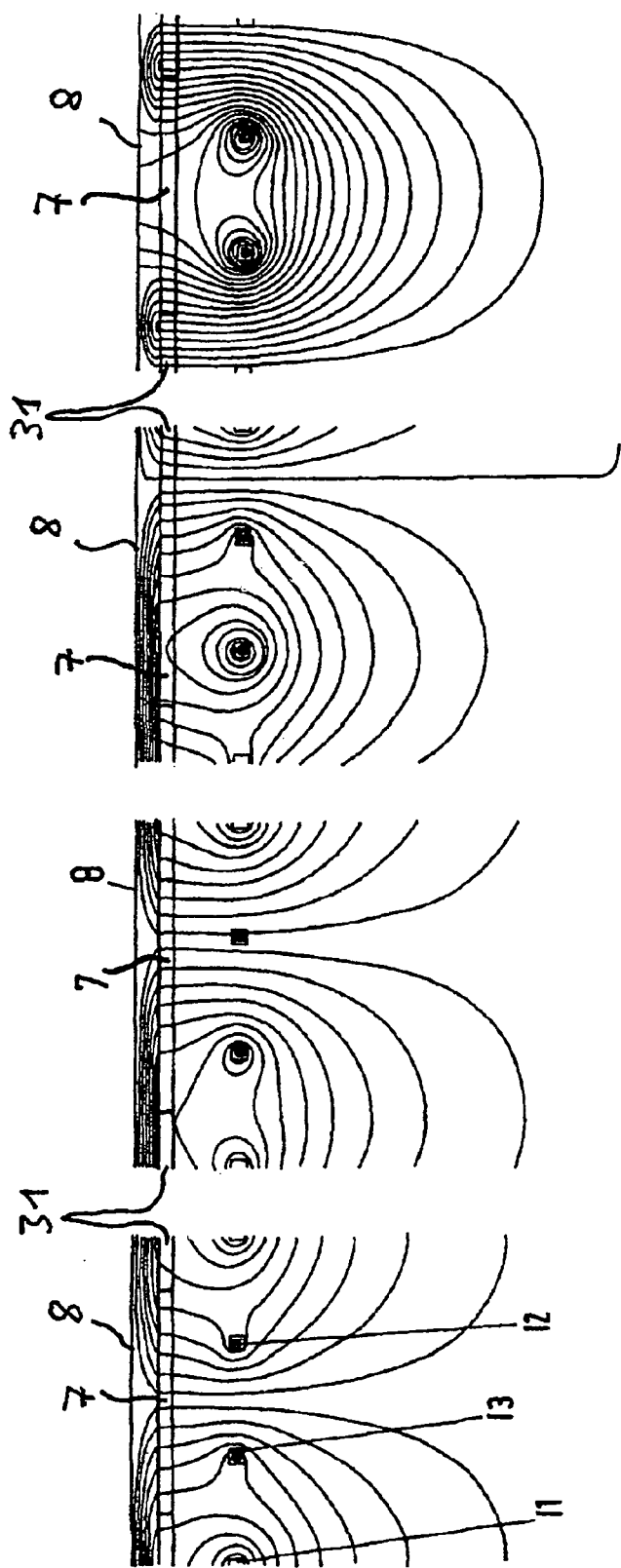

The bent lines in FIG. 3 are field lines of the magnetic field which is produced by the sections of lines 1, 2, 3 shown in FIG. 1. FIG. 3 depicts the situations at four different points in time which correspond to "0", "30", "60", "90" on the time scale of FIG. 2. The time scale of FIG. 2 can also be interpreted as a scale showing the angle of the sinusoidal behaviour of the currents, which means that FIG. 2 shows the behaviour of the currents over one full period, i.e. the current values at the beginning of the period at "0" are the same as at the end of the period at "360". If the term "phase shift" is used in this description, the phases of alternating currents (as shown, for example, in FIG. 2) or the phases of corresponding alternating voltages are meant. In contrast, the switching actions of inverters (that are connected to the segments) and the corresponding fluctuations or "ripples" (not shown in FIG. 2) of the alternating current are not meant. However, the alternating currents do not have to be sinusoidal currents. Other wave forms are also possible, for example rectangular waves.

In the left of the four partial diagrams of FIG. 3, cross sections of transversely extending sections of lines 1, 2, 3 are shown. Reference sign °I1° denotes the current I1 which is flowing through a transversely extending section of line 1 and so on. These transversely extending sections extend perpendicularly to the image plane of FIG. 3, wherein the image plane is a vertical cut plane through the arrangement 12 of FIG. 1, wherein the image planes of FIG. 1 and FIG. 3 are perpendicular to each other and wherein the image plane of FIG. 3 extends in the direction of travel, cutting the sections 5 of FIG. 1 in two halves. In the upper regions of FIG. 3, electromagnetic coils 7 are schematically shown as flat rectangular framed areas. On top of these coils 7, which are parts of a receiving device of a vehicle for receiving the energy from the arrangement 12, ferromagnetic backbones 8 are located in order to bundle and divert the magnetic field lines. These backbones 8 have the functions of a core of an electromagnet.

Figure 4:
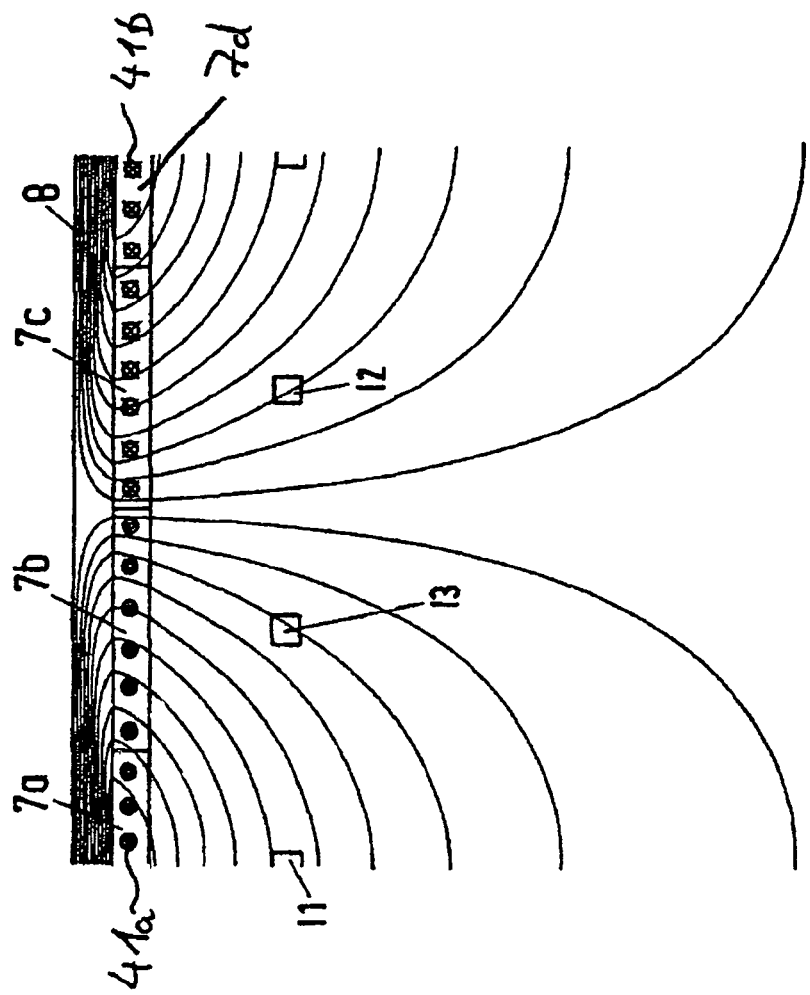

FIG. 4 shows a similar view as the views shown in FIG. 3. However, the figure is meant to illustrate the hypothetical situation that coils in the vehicle (which is travelling on the track) induce a current in the conductor arrangement of the track. In addition to FIG. 3, FIG. 4 also shows cross sections through electric conductors 41a, 41b in the regions 7a, 7b, 7c, 7d of the coil 7. In region 7a, 7b, a current which is oriented upwardly out of the image plane of FIG. 4 is flowing at the depicted point in time. On the right hand side of FIG. 4, where regions 7c, 7d of coil 7 are shown, the current is directed downwardly into the image plane of FIG. 4, as indicated by crossed lines. The electromagnetic field (illustrated by the field lines in FIG. 4) which is produced by the coil 7, is symmetric to the border line of sections 7b and 7d, since the amounts of the currents in sections 7a to 7d are also symmetric to the border line.

Figure 5:
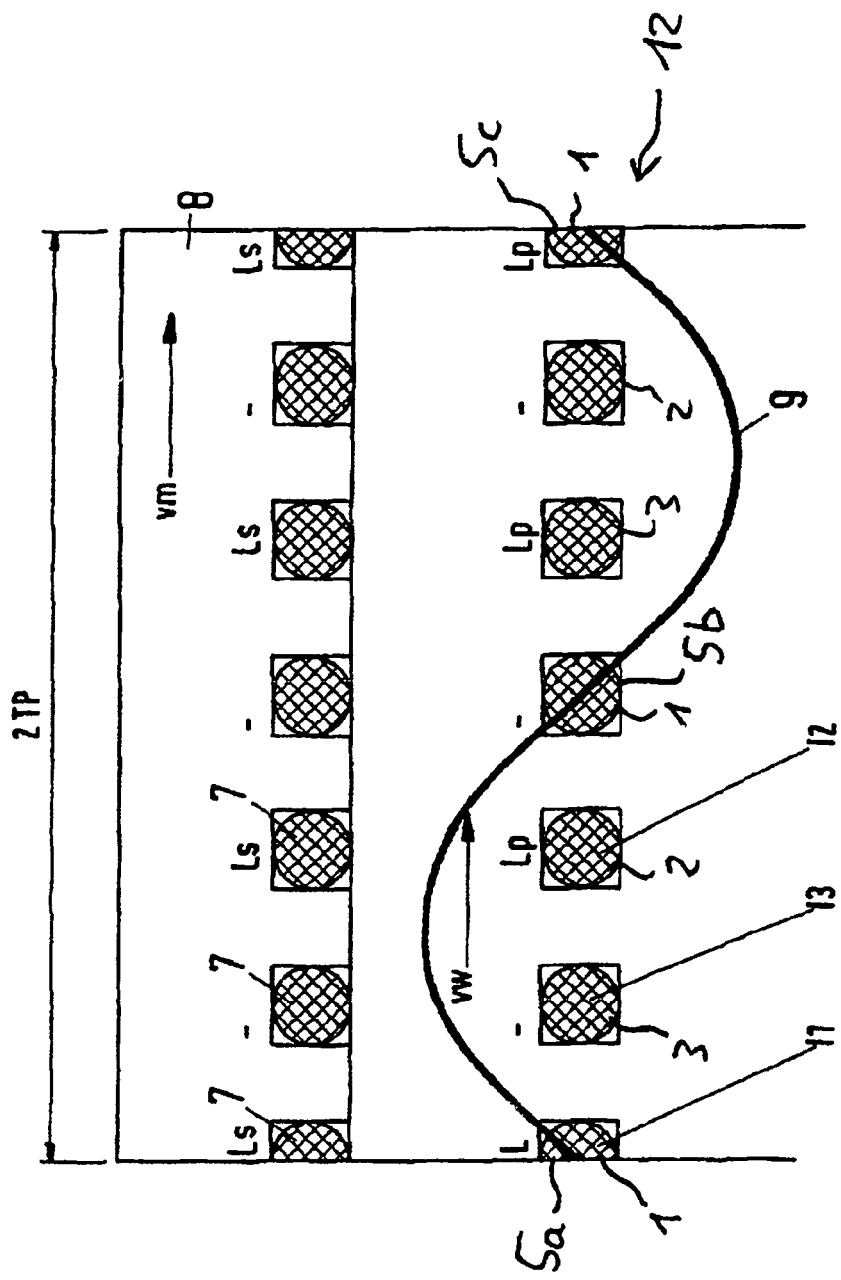

FIG. 5 shows another cut along a cutting plane which extends vertically and which extends in the travel direction. The wires or bundles of wires of lines 1, 3, 2 which are located in sections of the lines 1, 3, 2 which extend transversely to the direction of travel are shown in the upper half of FIG. 5. In total, seven sections of the arrangement 12 which extend transversely to the travel direction are shown in FIG. 5, at least partially. The first, fourth and seventh section in the row (from left to right) belong to line 1. Since the direction of the current I1 through section 5b (the fourth section in FIG. 5) is opposite to the direction of the current I1 through the sections 5a, 5c (the first and the seventh section in FIG. 5), and since the currents I1, I3, I2 are alternating currents, the produced electromagnetic wave is moving in the direction of travel at a speed vw. The wave is denoted by 9, the inductivity of the arrangement 12 by Lp.

The cross sections shown in the upper half of FIG. 5 represent a receiving device of a vehicle which is travelling in the direction of travel and at a speed vm and at the top of FIG. 5 "2 TP" indicates that FIG. 5 shows a line segment of arrangement 12, the length of which is equal to twice the distance between three consecutive transversely extending sections of a line, here line 1.

Figure 6:
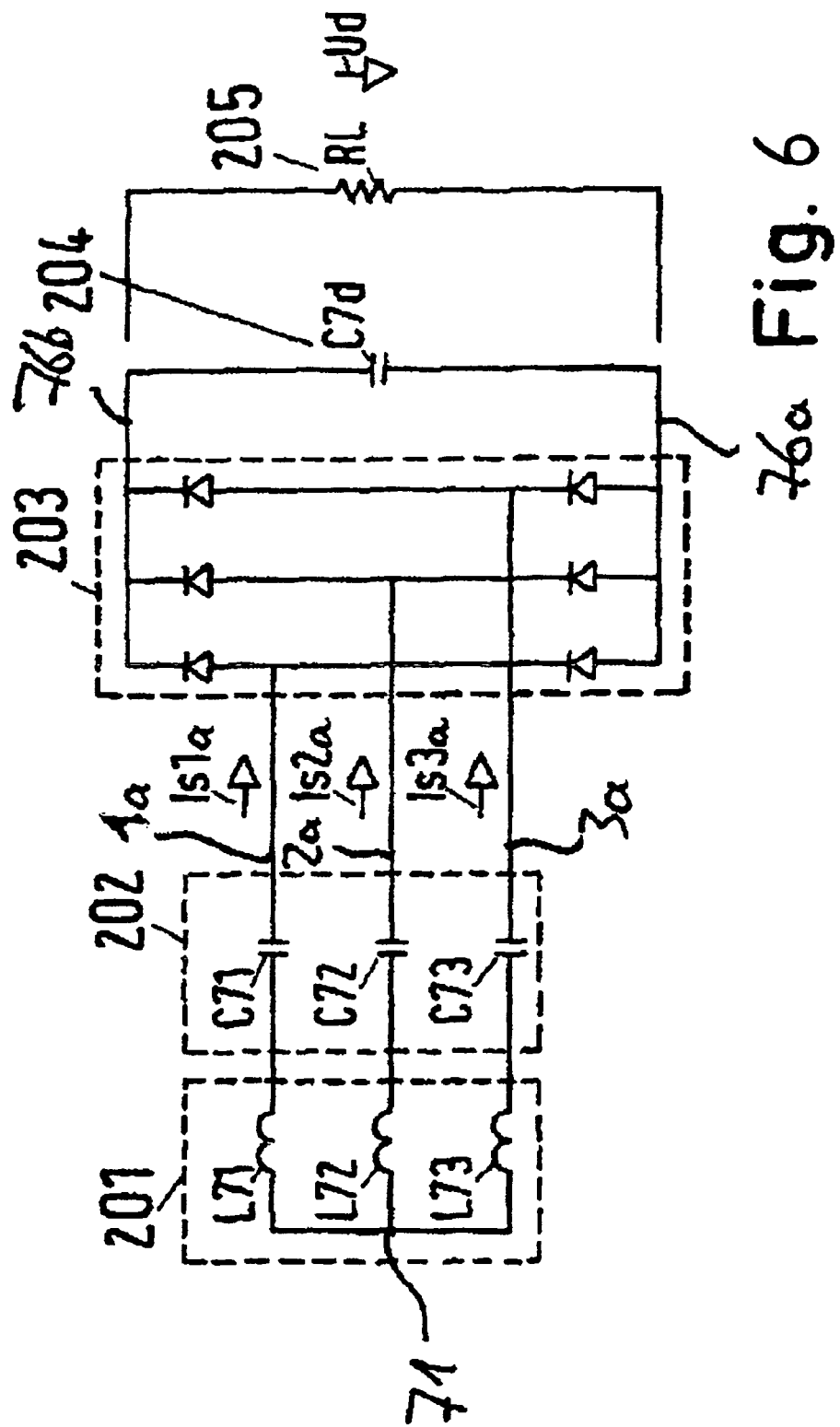

FIG. 6 shows a circuit diagram of an arrangement which may be located in or under a vehicle which is travelling on the track. The arrangement comprises a three-phase receiving device for receiving the electromagnetic field from the track and for producing electric energy there from. The receiving device comprises one coil or an arrangement of coils for each phase 1a, 2a, 3a, wherein the coils are denoted by L71, L72, L73 (block 201). In the embodiment shown, the phases 1a, 2a, 3a are connected together at a common star point 71. Leakage inductivities (not separately shown in FIG. 6) of the phases 1a, 2a, 3a are compensated by capacities C71, C72, C73, as shown in block 202.

The output side of the receiving device 201, 202, where the phase currents Is1a, Is2a, Is3a are shown in FIG. 6 is connected to an AC/DC (alternating current/direct current) converter 203. The DC-side of the converter 203 is connected to lines 76a, 76b of an intermediate circuit. The lines 76a, 76b are connected to each other via a smoothing capacity C7d as indicated by "204". The electric load, which may be provided with energy within the vehicle is denoted by a resistance RL at "205" which may be connected to the lines 76a, 76b of the intermediate circuit. "Ud" indicates that the load RI may cause a voltage drop, wherein Ud is the voltage in the intermediate circuit for example.

Figure 7:
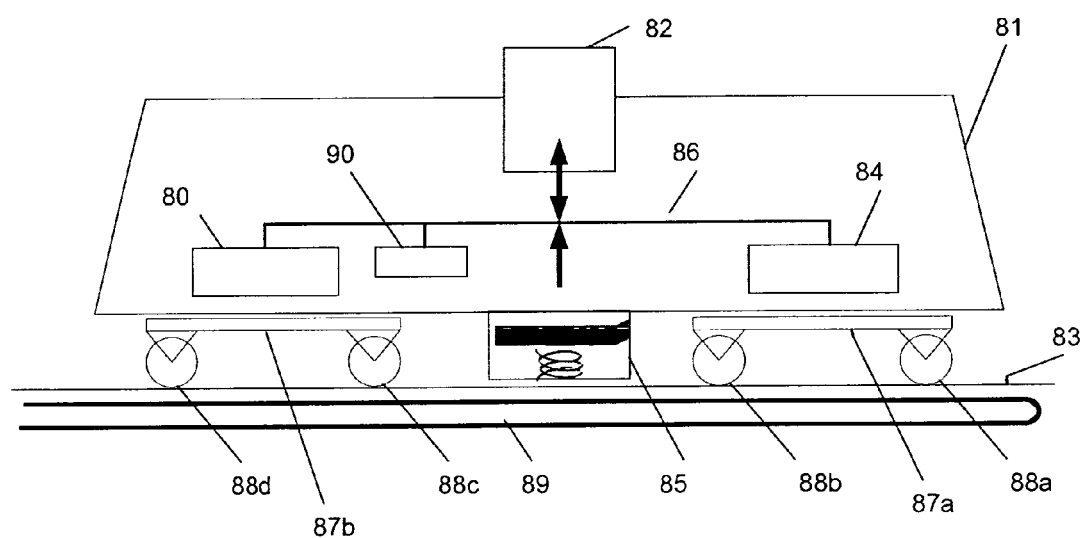

FIG. 7 shows a track 83 (here: a railway track having two rails) which is occupied by a track bound vehicle 81, such as a regional public transport train or a tram.

The arrangement shown comprises an electric conductor arrangement for producing an electromagnetic field, thereby transferring energy to the vehicle on the track. The conductor arrangement 89 is shown schematically. For example, the conductor arrangement may be designed as shown in FIG. 1. The conductor arrangement 89 (and this applies to other arrangements, not only to the example shown in FIG. 7) may be located under ground or above ground. In particular in the case of railways having two rails on which wheels of rail vehicles may roll, the conductor arrangement may be located above ground between the rails on the level of a railway sleeper, or partly above ground, but under the railway sleepers. If the railway sleepers are made of concrete for example, the sleepers or the other construction for holding the rails may comprise holes and/or cavities, through which the line or lines of the conductor arrangement extends. Thereby, the railway construction may be used to hold the line(s) in the desired serpentine shape.

The track bound vehicle 81 comprises at its underside a receiving device 85 for receiving the electromagnetic field which is produced by the conductor arrangement 89. The receiving device 85 is electrically connected to an on-board electric network 86 so that the electric energy, which is induced in the receiving device 85 may be distributed within the vehicle 81. For example, auxiliary devices 90 and propulsion units 80, 84 for driving propulsion motors (not shown) in bogies 87b 87b having wheels 88a, 88b, 88c, 88d may be connected to the distribution network 86. Furthermore, an energy storage 82, such as an electrochemical energy storage or an arrangement of capacitors, such as super caps, may also be connected to the distribution network. Therefore, the energy storage 82 may be charged by the energy received by the receiving device, in particular during stops of the vehicle 81 on the track. When the vehicle 81 is moving on the track, a part of the propulsion energy which is needed to move the vehicle 81 may be withdrawn from the energy storage 82 and at the same time the energy, which is received by the receiving device may contribute to the propulsion, i.e. may be part of the propulsion energy.

Figure 8A:
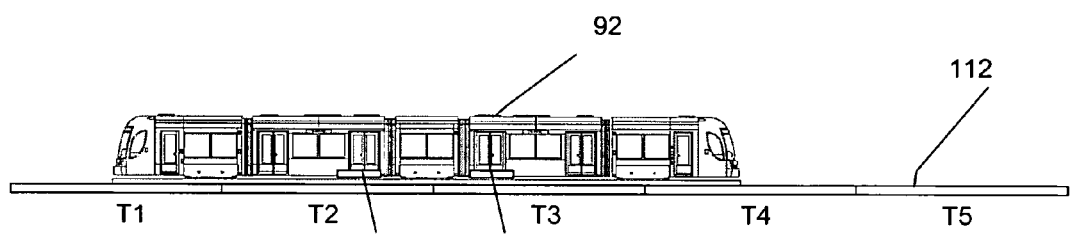
Figure 8B:
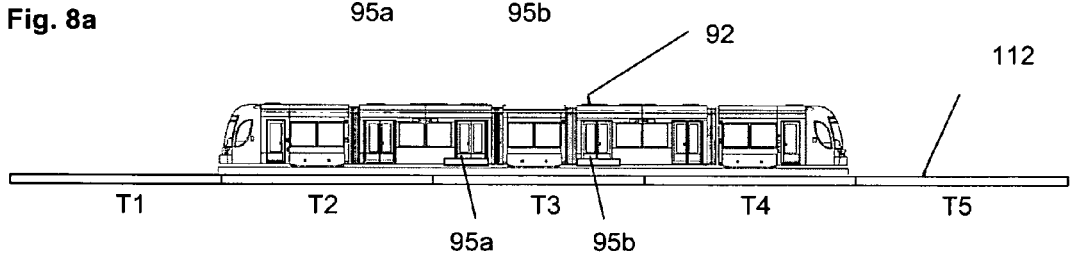
Figure 8C:
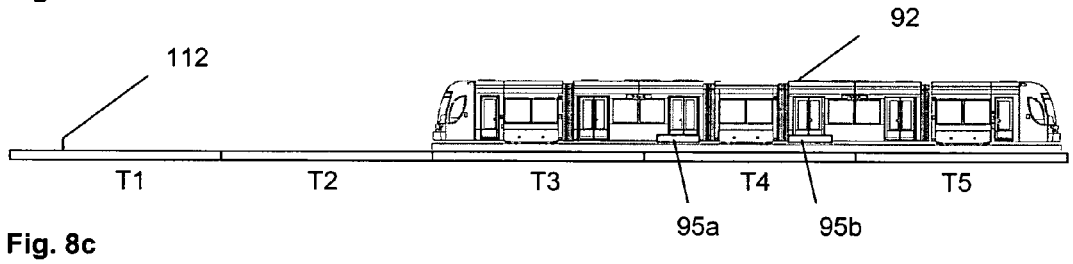

FIG. 8a-c illustrate the concept of a conductor arrangement 112 comprising sections which can be switched on and off so that only sections, which are switched on produce an electromagnetic field in order to transfer energy to the vehicle or vehicles on the track. The examples of FIG. 8 show five segments T1, T2, T3, T4, T5 which are arranged in a row of successive segments along the track.

A vehicle 92, such as a tram, is travelling on the track. Under floor of the vehicle 92 two receiving devices 95a, 95b for receiving electromagnetic field produced by the segments are provided. The receiving devices 95a, 95b may be redundant devices, wherein just one of the devices is necessary for operating the vehicle. This increases operation reliability. However, the devices 95a, 95b may also be non-redundant devices which may produce energy at the same time for operating the vehicle. However, it may happen in this case, that at least one of the devices 95 may not produce electric energy. Instead of two receiving devices, the vehicle may comprise more receiving devices.

The following description relates to all these cases and, in addition, to the case that the vehicle has just one receiving device.

According to the examples shown in FIG. 8, the vehicle is moving from the left to the right. In FIG. 8a, the vehicle 92 occupies the track above elements T2, T3 and partly occupies the track above elements T1 and T4. The receiving devices 95 or the receiving device are/is located always above elements which are fully occupied by the vehicle. This is the case, because the distance between the receiving devices to the nearest end of the vehicle in lengthwise direction is greater than the length of each segment of the conductor arrangement 112.

In the situation of FIG. 8a, the elements T2, T3 are switched on and all other elements T1, T4, T5 are switched off. In FIG. 8b, where the vehicle 92 fully occupies the track above elements T2, T3 and nearly fully occupies the track above element T4, element T2 has been switched off, because the receiving devices 95 or the receiving devices have/has already left the region above element T2, and element T4 will be switched on as soon as the vehicle fully occupies the region above the element T4. This state, when the element T4 is switched on is shown in FIG. 8c. However, in the meantime element T3 has been switched off.

Figure 9:
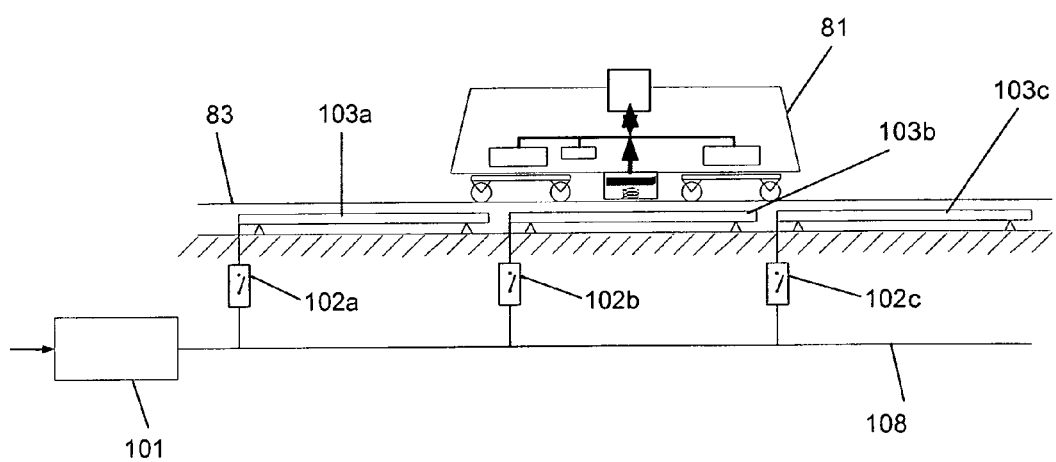

FIG. 9 shows an arrangement which is similar to the arrangements shown in FIG. 8. In fact, it may be a different view of the same arrangement as shown in FIG. 9. However, FIG. 9 shows additional parts of the arrangement. Each of the successive segments 103a, 103b, 103c of the conductor arrangement for producing an electromagnetic field is connected to the DC supply line 108 via one separate inverter 102a, 102b, 102c for producing an alternating current in the segment. The consecutive segments 103a, 103b, 103c are not electrically connected in series to each other. One end of the lines of the segment 103a, 103b, 103c is connected to the respective inverter 102a, 102b, 102c. At the other end of the segment, the lines may be connected to a common star point. However, FIG. 9 does not show the preferred embodiment.

Figure 11:
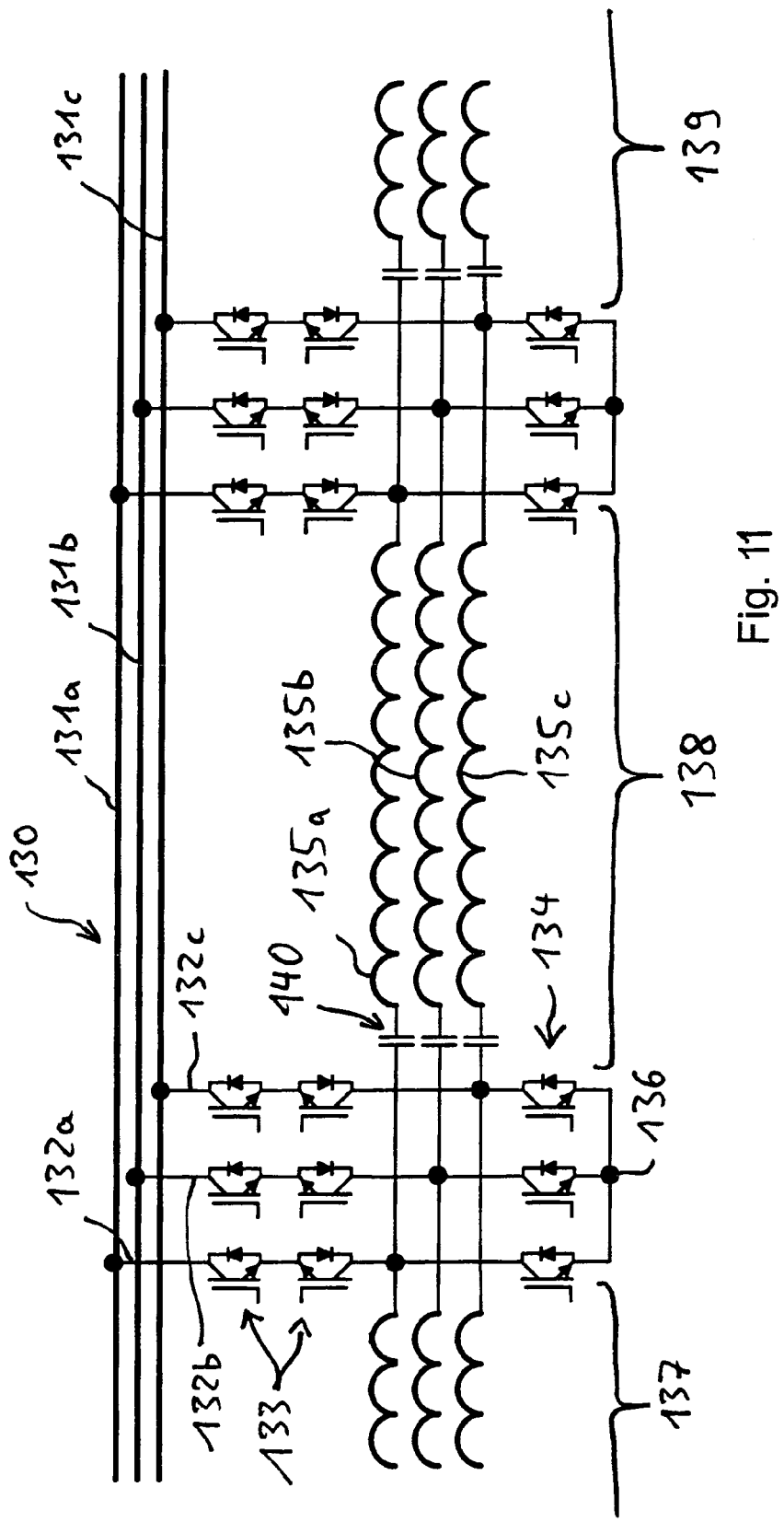

FIG. 11 shows a circuit diagram. A row of consecutive segments 137, 138, 139 of an electric conductor arrangement for producing an electromagnetic field is partially shown in the figure. Only one segment is fully shown, namely segment 138. The segments 137, 138, 139 each comprise three phase lines 135a, 135b, 135c. These phase lines 135 may be realized in the manner shown in FIG. 1, for example. In particular, the transversely extending sections of the phase lines of consecutive segments 137, 138, 139 may be located at constant distances in the direction of travel (from right to left or from left to right in FIG. 11), despite the interfaces between the consecutive segments 137, 138, 139. The interfaces will be described in more detail below.

Each phase line 135 of each segment 137, 138, 139 comprises at one end of the phase line 135 a capacity 140 for compensating the inductance of the phase line 135. As a result, the impedance is zero.

At the interfaces between the consecutive segments 137, 138, 139, each phase line 135 is connected to one of three alternating current lines 131a, 131b, 131c of an AC power supply line 130. The connections are denoted by reference numerals 132a, 132b, 132c and each of the connections 132 comprises switches 133 for switching on and off the connection between the phase lines 135 and the alternating current lines 131. However, these switches 133 are only operated (i.e. switched on or off) if the operation of one of the segments 137, 138, 139 starts or stops.

Furthermore, each of the connections 132 is connected via in each case one switch 134 to a common star point 136. Therefore, the switches 133 at a specific interface may be switched off but the star point switches 134 may be switched on. Consequently, the phase lines 135 are shorted at this interface and can be fed with an alternating current at an opposite end of the segment.

However, as mentioned before, the present invention proposes not to use an alternating current line 130, but instead a direct current power supply line as shown in FIG. 12. The plus and minus lines of the DC supply line are denoted by reference numerals 141a, 141b. In practice, one of these lines 141 may be realized by ground, for example by the rails of a railway.

The circuit diagram shown in FIG. 12 is identical with the arrangement shown in FIG. 11 with regard to the segments 137, 138, 139. The same reference numerals are used in FIGS. 11 and 12.

The connection of the interfaces between the segments 137, 138, 139 and the DC power supply line 141a, 141b differs compared to FIG. 11. Each phase line 135 is connected to plus and minus potential of the DC supply line 141 via in each case one switch 147, 148. For example, phase line 135a is connected via connection 144a to plus potential and minus potential. Within connection 144a, the switch between phase line 135a and plus potential is denoted by reference numeral 147 and the switch between the phase line 135a and minus potential is denoted by 148. The connections 144b, 144c of the phase lines 135b, 135c to plus and minus potential (lines 141a, 141b) are constructed in the same manner. This description applies to interface 142 between segment 137 and segment 138. At the interface between segment 138 and segment 139, the connections between the phase lines 135 and the DC supply line 141 are denoted by reference numerals 145a, 145b, 145c. The switches between the phase lines 135 and the plus potential of line 141a are denoted by 149 and the switches to the minus potential are denoted by 150.

Consequently, each interface 142, 143 can be connected and disconnected to/from the supply line 141 by operating switches 147, 148 or 149, 150. The switches 147, 148 constitute a first inverter, together with a control of the switches 147, 148 which is not shown in FIG. 12. In the same manner, switches 149, 150 and a corresponding control for controlling the switching operations of these switches constitute a second inverter at interface 143. During operation of the inverters, the switches of the inverter are repeatedly switched on and off to produce a desired alternating current at the interface 142, 143, i.e. at the end of one of the segments 137, 138, 139. For example, the connection 144a for connecting the DC supply line 141 to phase line 135a therefore comprises a series connection of switch 147 and switch 148 wherein a connection is made between phase line 135a and a contact point between the switches 147, 148.

Figure 13:
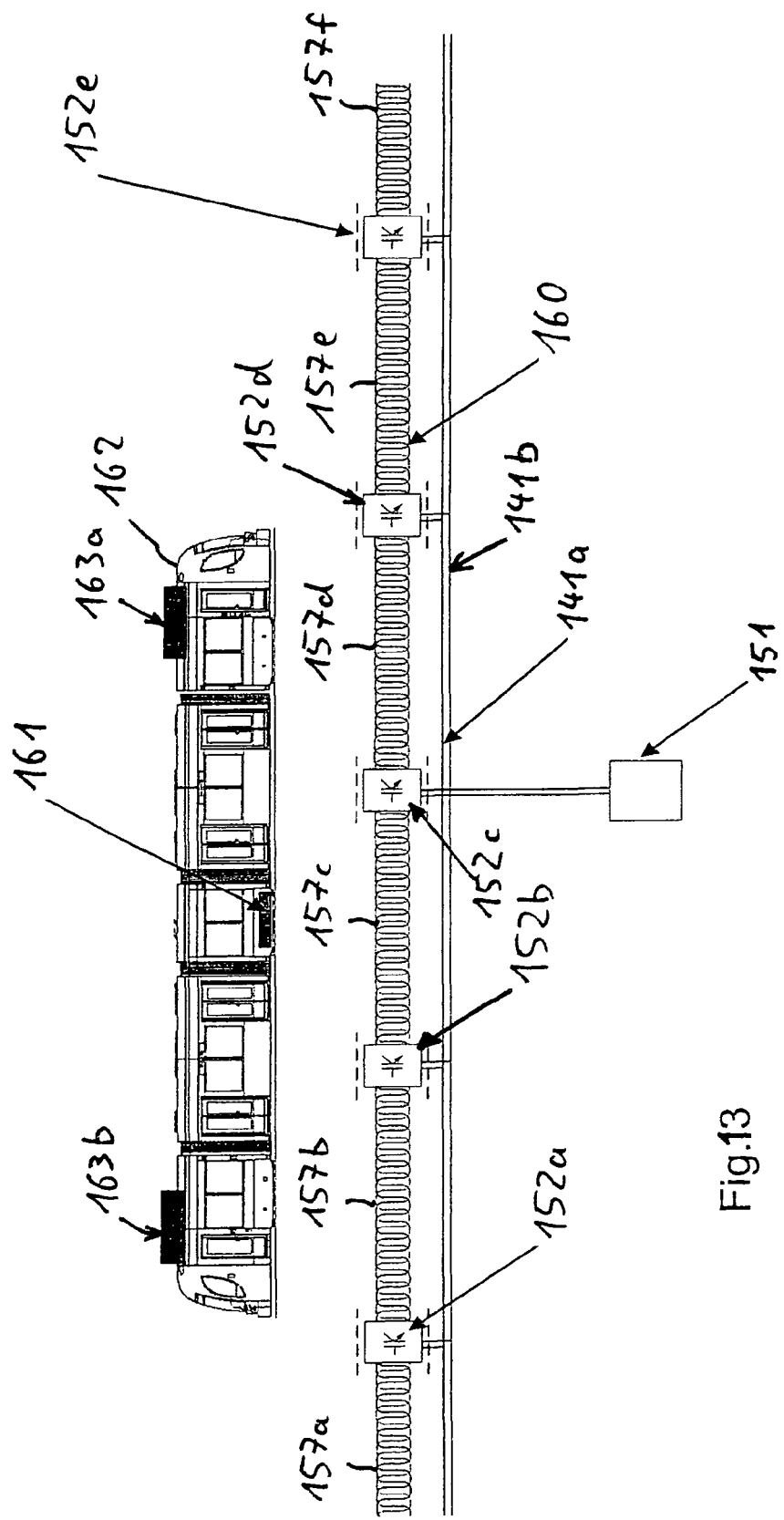

As shown in FIG. 13, a plurality of segments 147a to 147f may be arranged as consecutive segments along the path of travel of a vehicle. The vehicle may comprise a receiving device 161 for receiving the electromagnetic field produced by one or more than one of the segments 157. In the situation shown in FIG. 13, the receiving device 161 is located above segment 157c and at least this segment 157c is operated to produce an electromagnetic field and to provide energy to the vehicle. Furthermore, the vehicle may comprise energy storages 163a, 163b which may be used to operate the vehicle if not sufficient energy is received from the segments 157.

At each interface between two consecutive segments 157, an inverter 152a to 152e is provided. For example, the inverters 152 may be realized according to the circuit diagram of FIG. 12.

The DC power supply line 141a, 141b is also shown in FIG. 13. It is connected to an energy source 151, such as a power station for producing a direct current.

Figure 14:
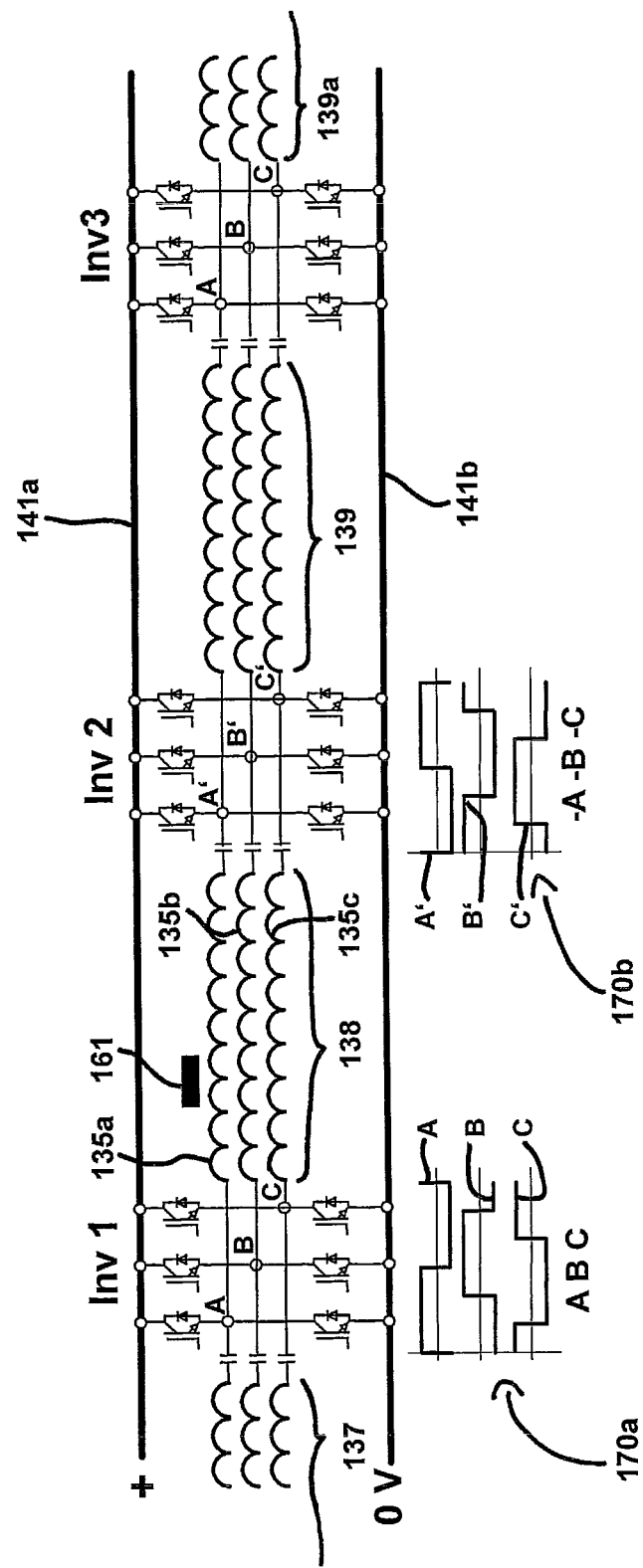
Figure 15:
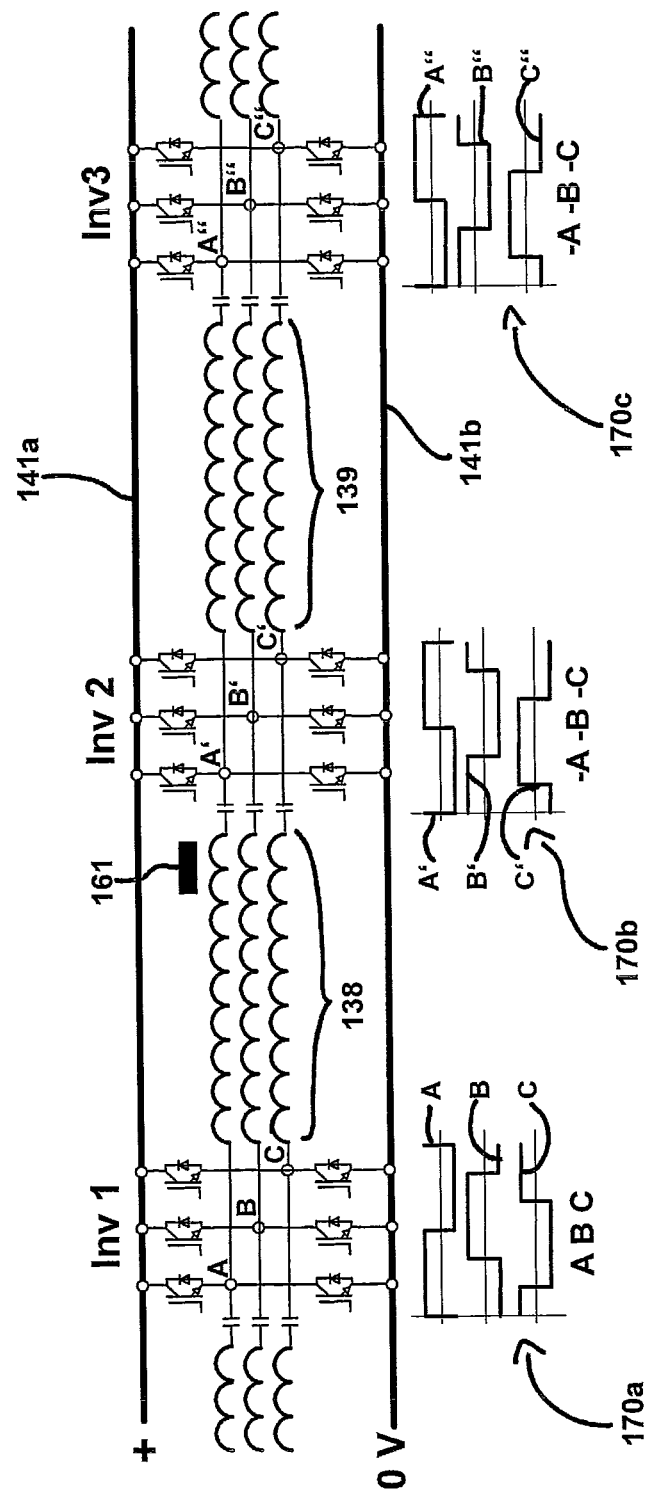
Figure 16:
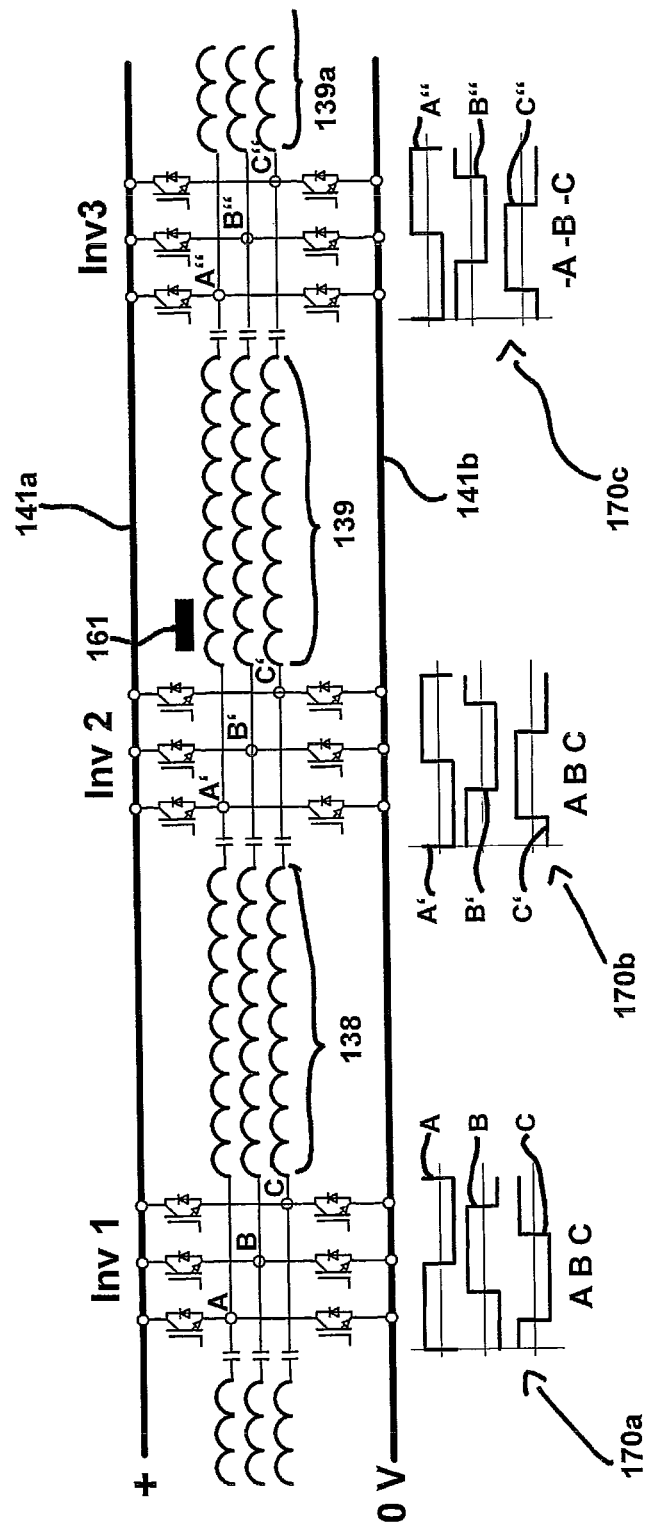

In connection with FIG. 14-16, a series of operating actions for operating an arrangement according to the present invention will be described. The arrangement shown in FIG. 14-16 is similar to the arrangement shown in FIG. 12. The only difference is that two consecutive segments 138, 139 and their respective interfaces to neighboring segments are fully shown in FIG. 14-16. The inverters at the three interfaces shown in FIG. 14-16 are denoted by Inv1, Inv2, Inv3. The constitution of these inverters was described with reference to FIG. 12.

In the situation shown in FIG. 14, the receiving device 161 of a vehicle is travelling along a section of the path of travel and this section is defined by the extension of the segment 138 in the direction of travel. The receiving device 161 is moving from left to right in FIG. 14. The beginning of segment 138 is defined by the interface to segment 137 where inverter Inv1 is located. The end of segment 138 is defined by the interface to segment 139 where inverter Inv2 is located. In the same manner, the beginning of segment 139 which is the neighboring segment of segment 138, is defined by the location of inverter Inv2 and the end of segment 139 is defined by the location of inverter Inv3.

Furthermore, FIG. 14 shows schematically the electric potential produced by inverter Inv1 as a function of time (diagram 170a) and also shows the electric potential produced by inverter Inv2 as a function of time (diagram 170b). The upper line (which is a rectangular alternating voltage line in the example of FIG. 14, but may also be an alternating voltage line of other shape) is denoted by letter A, indicating that this electric potential can be measured at point A at the interface of phase line 135a. In the same manner, the electric potentials at point B, the interface point of phase line 135b, and the electric potential at point C, the interface point of phase line 135c, are shown in diagram 170a. Diagram 170b shows the electric potential at corresponding interface points A', B', C' of inverter Inv2.

The diagrams 170 are used to illustrate the phase shift between the inverters Inv1, Inv2. At the time of FIG. 14, this phase shift is 180° which means that the electric potential at point A and at point A' have the same absolute value, but the potential is negative for point A' when it is positive for point A and vice versa. The same applies to the other phases at points B, B' and C, C'. Since the altering voltage produced by inverters Inv1, Inv2 is a three phase alternating current, the phase shift between the three phases is 120°. More generally speaking, the inverters at the interfaces between consecutive segments produce alternating voltages preferably having a constant time period and constant peak voltages. The voltage level in the middle between the two peak voltages is shown for each phase in diagrams 170 as a horizontal line.

The phase shift between the electric potentials at opposite ends of a segment or a row of segments does not have to be 180° in order to produce an alternating current in the segment or row of consecutive segments. By controlling the phase shift, the peak and mean value of the alternating current through the segment can be controlled. For example, a reduced peak current may be desired for safety reasons.

Other than shown in FIG. 14, not only one segment can be operated in the manner described above (i.e. by producing a phase shift of the electric potential at the opposite ends of the segment), but also two or more consecutive segments can be operated in this manner. In this case, it is sufficient to operate one inverter at one end of the row of consecutive segments and one inverter at the opposite end of the row of consecutive segments. For example, in order to operate the segments 138, 139, inverter Inv3 may be operated in the same manner as inverter Inv2, shown in FIG. 14 and inverter Inv2 may be switched off at the same time (i.e. is not operated).

Coming back to the situation depicted in FIG. 14, the receiving device 161 is moving from left to right. When receiving device 161 approaches the end of segment 138 (FIG. 15) the operation of inverter Inv3 is started. Diagram 170c also shows the electric potentials as functions of time at interface points A", B", C" at the location of inverter Inv3. There is no phase shift between the electric potential produced by inverters Inv2, Inv3. Consequently, as long as inverter Inv2 is operated, there is no voltage across segment 139 and no current is flowing through segment 139.

As soon as the receiving device 161 reaches the interface between segments 138, 139 (or shortly before it reaches the interface) the operation of inverter Inv2 is stopped, i.e. all switches of inverter Inv2 stay open. Consequently, an alternating current is established through the consecutive segments 138, 139.

When the receiving device 161 has reached segment 139, inverter Inv1 can be switched off. In order to prepare this, first inverter Inv2 is switched on again, but with no phase shift to inverter Inv1. In other words, as shown in FIG. 16, the electric potentials produced by inverters Inv1, Inv2 are identical. As a result, the alternating current through segment 138 stops flowing. As a next step inverter Inv1 can be switched off.

The procedure which was described with reference to FIG. 14-16 can be repeated for the next consecutive segment 139a as soon as the receiving device 161 approaches the interface where inverter Inv3 is located.

With reference to FIGS. 17 and 18 an example will be described how the synchronization between the different inverters, for example the inverters of FIG. 14-16, can be realized.

FIG. 17 shows schematically the DC supply line 141 which extends along the path of travel (from left to right or right to left). Interfaces 191, 192, 193 between consecutive segments are symbolized by a small solid circle and reference numerals 191, 192, 193. At each interface 191, 192, 193, there is a connection between the DC supply line 141 and a controller 175, 176, 177. The controller controls the operation of the inverter (not shown in FIGS. 17 and 18) which is located at the interface 191, 192, 193. Each controller comprises a power section 175a, 176a, 177a for controlling the respective switches of the inverter.

Furthermore, FIGS. 17 and 18 show a synchronization link 178, which may be a digital data bus. The link 178 is also extending along the path of travel and comprises connections 178a, 178b, 178c to each of the controllers 175, 176, 177. The connection 178 is designed to transfer synchronization signals from the link 178 to the controller 175, 176, 177. In addition, there is also a connection from each controller 175, 176, 177 to the link 178. This reverse connection is denoted by 179a, 179b, 179c. In practice, the connections 178, 179 may be realized by the same data interface between the controller and the link. The connections 179 are used to transfer signals from the controllers to the link and thereby to other controllers which are connected to the link 178.

In the operation state depicted in FIG. 17, controller 175 is a master controller which outputs synchronization signals via connection 179a and via link 178 to the other controllers 176, 177 for synchronizing the operation of all controllers which are operated at a time.

In order to reduce delays or computational errors in the handling of the synchronization signals by the different controllers, the master controller 175 also receives the synchronization signal from the link 178, i.e. receives the signal which was output by itself. Therefore, the handling of the synchronization signal is the same in all converters.

The master controller 175 may also output the information to the other controllers if the operation of the other inverters should be performed with a phase shift or no phase shift.

For example, in the situation depicted in FIG. 15, controller 175 may be the controller of inverter Inv1, controller 176 may be the controller of inverter Inv2 and controller 177 may be the controller of inverter Inv3. Controller 175 outputs the synchronization signal to the controllers of inverters Inv2, Inv3 and also outputs the information to inverters Inv2 and Inv3 that the operation is to be performed at a phase shift of 180°. Alternatively, the information about the phase shift may be transferred to the other controllers together with the synchronization signals. If the delay caused by the transfer of the synchronization signals between the controllers is constant, the information about the phase shift may also be transferred by using pulse signals, i.e. by the timing of the pulse signals. Each pulse signal may be interpreted as a clock signal and the receiving controller may synchronize the control with the receipt of the clock signals.

FIG. 18 shows a different operating state of the arrangement of FIG. 17. In the meantime the segment between the inverter controlled by controller 175 and the inverter controlled by controller 176 may have been switched off. Therefore, controller 175 is no longer the master controller. Since the inverter controlled by controller 176 is still operating, this controller 176 has taken over the task of being the master controller, i.e. a corresponding message may have been sent via link 178 from controller 175 to controller 176, when the operation of the inverter controlled by controller 175 stops. As a result, controller 176 outputs synchronization signals via connection 179b and via link 178 to the other controllers.

On receipt of the synchronization signals, each controller which is operated at a time outputs signals to the power section of the controller or directly transfers the received synchronization signal to the power section.

FIG. 19 shows a rail vehicle 214 at the top of the figure. The vehicle 214, for example a tram, comprises two receiving devices 218a and 218b for receiving the electromagnetic energy from the track. The figure shows at least parts of in total seven consecutive segments 211a-211g, although—in practice—there are usually much more consecutive segments. At the time which is depicted in FIG. 19, three of the segments, namely segments 211b, 211c and 211d are active, i.e. the lines of theses segments carry an alternating current thereby producing the electromagnetic field for transferring electromagnetic energy to the receiving devices 218 of the vehicle 214. Each of the segments comprises three lines and each of the line carries one of three phases of the alternating current while active.

Each segment 211 is connected to a DC-supply line 213a, 213b via a constant current source A1, B1, C1 which is shown in FIG. 20. Arrangement A1, B1, C1, can be housed in a single box, for example. As shown in FIG. 19, the DC-supply line 213 is connected to a supply station 215 which delivers the required DC-current to the DC-supply line 213. The constant current source A1, B1, C1 comprises an inverter C1 having connections for connecting the DC-supply lines 213a, 213b. The connections are combined with an inductivity 219a, 219b. The primary side of the inductivity 219 is connected to the respective DC-line 213 and the secondary side of the inductivity 219 is connected to the three current paths 221a, 221b, 221c for producing the three phases of the alternating current. Each current path 221 comprises two semiconductor power switches which are connected in series to each other and the alternating current lines are connected to a point in between the switches in the respective current path. Regarding the semiconductor switches and the current path the inverter may be a conventional three phase inverter and, therefore, further details are known to a skilled person.

However, there is a further connection between the secondary sides of the inductivities 219 which comprises two capacities 223a, 223b which are connected in series to each other. A point in between the capacities 223 is connected to each of the alternating current lines via in each case at least one first inductivity 225a, 225b, 225c. Furthermore, the point in between the two capacities 223 is connected to another point in each of the alternating current lines 216a, 216b, 216c via a second capacity 227a, 227b, 227c. These connection points are located an opposite side of an inductivity 226a, 226b, 226c in the alternating current line 216a, 216b, 216c with respect to the connection where the first capacity 225a, 225b, 225c is connected to the alternating current line 216a, 216b, 216c. The connections where the first capacities 225 are connected to the alternating current line 216 are shown in FIG. 20 within block B1 and the connections where the second capacities 227 are connected to the alternating current lines 116 are shown within block A1 in FIG. 20. Block A1 also comprises the inductivities 226.

Blocks A1, B1 constitute a so called six-pole filter, including compensation capacitors which compensate for the inductivities of the lines in the segments which produce the primary side electromagnetic field.

When operated, i.e. while the semiconductor switches of inverter C1 are repeatedly switched on and off, the constant current source produces an alternating current having a constant effective mean value independent of the power which is thereby produced within the segment 211 and is transferred to the receiving devices 218 of the vehicle 214.

The invention claimed is:

1. A system for transferring electric energy to a vehicle, wherein the system comprises an electric conductor arrangement for producing an alternating electromagnetic field and for thereby transferring the energy to the vehicle, the electric conductor arrangement comprises at least one alternating current line, wherein each alternating current line is adapted to carry one phase of an alternating electric current, the conductor arrangement comprises a plurality of consecutive segments, wherein the segments extend along a path of travel of the vehicle, each segment comprising one section of each of the at least one alternating current line, the system comprises ,a direct current supply line for supplying electric energy to the segments, each segment is connected to the supply line via at least one inverter which is adapted to invert a direct current carried by the supply line to an alternating current carried by the at least one alternating current line, a first inverter connects the supply line to a first end of the section(s) of a segment and a second inverter connects the supply line to a second end of the section(s) of the same segment or of the section(s) of a consecutive row of segments, wherein the first end and the second end are opposite ends of the segment or of the row of segments, and the system is adapted to operate the first inverter and the second inverter at a predefined phase shift relative to each other, thereby producing an alternating voltage across the segment or row of segments, which alternating voltage causes a corresponding alternating current to flow through the segment or row of segments.

2. The system of claim 1, wherein the inverter comprises phase switches adapted to repeatedly connect and disconnect the supply line with/from the alternating current line of a phase, thereby producing the alternating current.

3. The system of claim 1, wherein the conductor arrangement is arranged in such a manner that at least two consecutive segments can be operated at a time, wherein corresponding sections for carrying the same phase of the alternating current in the consecutive segments are connected in series to each other.

4. The system of claim 1, wherein the system is adapted to start an operation of a third inverter in order to cause the alternating current to flow through an extended row of consecutive segments, wherein the third inverter connects the supply line to a third end of the section(s) of another segment, wherein the third end is located further away along the track from the first end than the second end and is located at the end of the extended row of consecutive segments and wherein the system is adapted to synchronize the third inverter with the second inverter so that the second and third inverter are operated with no phase shift.

5. The system of claim 1, wherein the segments are shorter than the length of a vehicle in the travel direction and wherein the system is adapted to operate segments only if a vehicle is occupying a respective section of the path of travel where the segment is located.

6. The system of claim 5, wherein the system is adapted to operate the segments only if a vehicle is fully occupying a respective section of the path of travel.

7. A method for transferring electric energy to a vehicle, wherein an electromagnetic field is produced by an electric conductor arrangement thereby transferring the electric energy to the vehicle, the electromagnetic field is produced by conducting an alternating current through at least one of consecutive segments of the conductor arrangement, wherein the segments extend along the track, the alternating current is limited to a specific segment or to a specific row of consecutive segments of the conductor arrangement by operating or not operating at least two of a plurality of inverters which connect, in each case, a direct current supply line to one interface between two consecutive segments in order to generate the electromagnetic field in a restricted region of the path of travel of the vehicle, a first inverter is operated which connects the supply line to a first end of a segment and a second inverter is operated which connects the supply line to a second end of the same segment or of a consecutive row of segments including the segment, wherein the first end and the second end are opposite ends of the segment or of the row of segments, the first inverter and the second inverter are operated at a predefined phase shift relative to each other thereby producing an alternating voltage across the segment or row of segments, which alternating voltage causes a corresponding alternating current to flow through the segment or row of segments.

8. The method of claim 7, wherein at least two consecutive segments are operated at the same time, wherein corresponding sections of the lines for carrying the same phase of the alternating current in the consecutive segments are connected in series to each other.

9. The method of claim 7, wherein the lengths of the segments along the path of travel are shorter than the length of a vehicle in the travel direction and wherein segments are operated only if a vehicle is already occupying the respective region of the path of travel along which the segment extends.

10. The method of claim 9, wherein the segments are operated only if a vehicle is fully occupying the respective region of the path of travel.

11. The method of claim 7, wherein a segment is switched on before a receiving device of a vehicle for receiving the transferred energy enters the region of the path of travel along which the segment extends.

12. The method of claim 7, wherein the inverters are operated by repeatedly closing and opening phase switches thereby connecting and disconnecting the supply line with/from the alternating current line of a phase, thereby producing the alternating current.

13. The method of claim 12, wherein an operation of a third inverter is started in order to cause the alternating current to flow through an extended row of consecutive segments, wherein the third inverter is operated to connect the supply line to a third end of the section(s) of another segment, wherein the third end is located further away along the track from the first end than the second end and is located at the end of the extended row of consecutive segments and wherein the third inverter and the second inverter are synchronized so that the second and third inverter are operated with no phase shift.

* * * * *

UNITED STATES PATENT AND TRADEMARK OFFICE
CERTIFICATE OF CORRECTION

PATENT NO.         : 8,544,622 B2
APPLICATION NO.    : 13/063822
DATED              : October 1, 2013
INVENTOR(S)        : Kurt Vollenwyder et al.

Page 1 of 1

It is certified that error appears in the above-identified patent and that said Letters Patent is hereby corrected as shown below:

In the Claims

Column 22, Line 13, Claim 1, delete ",a" and insert -- a --

Signed and Sealed this
Eighteenth Day of February, 2014

Michelle K. Lee
*Deputy Director of the United States Patent and Trademark Office*